(12) United States Patent
Shiozaki et al.

(10) Patent No.: US 11,639,993 B2
(45) Date of Patent: May 2, 2023

(54) RADAR APPARATUS

(71) Applicant: Panasonic Intellectual Property Management Co., Ltd., Osaka (JP)

(72) Inventors: Ryosuke Shiozaki, Tokyo (JP); Yuto Suzuki, Miyagi (JP); Tooru Miura, Ishikawa (JP); Ken Takahashi, Ishikawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 212 days.

(21) Appl. No.: 17/159,981

(22) Filed: Jan. 27, 2021

(65) Prior Publication Data

US 2021/0231797 A1  Jul. 29, 2021

(30) Foreign Application Priority Data

Jan. 29, 2020 (JP) .............................. JP2020-012307
Jan. 29, 2020 (JP) .............................. JP2020-012310

(51) Int. Cl.
*G01S 13/931* (2020.01)
*H01Q 21/06* (2006.01)

(52) U.S. Cl.
CPC ......... *G01S 13/931* (2013.01); *H01Q 21/067* (2013.01)

(58) Field of Classification Search
CPC ...... G01S 13/931; H01Q 5/48; H01Q 1/3233; H01Q 9/065; H01Q 19/062; H01Q 19/108; H01Q 21/067; H01Q 21/08; H01Q 21/29
See application file for complete search history.

(56) References Cited

U.S. PATENT DOCUMENTS

| | | | | |
|---|---|---|---|---|
| 4,414,550 A | * | 11/1983 | Tresselt | H01Q 21/20 342/373 |
| 5,874,915 A | * | 2/1999 | Lee | H01Q 21/205 342/372 |
| 6,496,155 B1 | * | 12/2002 | Sievenpiper | H01Q 15/0066 343/756 |
| 7,170,446 B1 | * | 1/2007 | West | H01Q 13/085 342/372 |
| 7,532,170 B1 | * | 5/2009 | Lee | H01Q 15/006 343/705 |
| 9,917,355 B1 | * | 3/2018 | Lee | H01Q 21/20 |
| 11,189,906 B2 | * | 11/2021 | Park | H01Q 1/2283 |
| 2005/0219126 A1 | * | 10/2005 | Rebeiz | H01Q 25/008 343/700 MS |

(Continued)

FOREIGN PATENT DOCUMENTS

| | | |
|---|---|---|
| JP | 2015-190809 | 11/2015 |
| WO | 2017/047396 | 3/2017 |

*Primary Examiner* — Peter M Bythrow

(74) *Attorney, Agent, or Firm* — Greenblum & Bernstein, P.L.C.

(57) ABSTRACT

A radar apparatus includes an antenna composed of an end-fire array antenna and including a plurality of antenna elements; and a circuit board in which the plurality of antenna elements is disposed side by side in a first direction. At least one of the plurality of antenna elements is parallel to a substrate surface of the circuit board. A directivity of at least one of the plurality of antenna elements is set to a third direction tilted with respect to the first direction and a second direction orthogonal to the first direction.

8 Claims, 15 Drawing Sheets

(56) References Cited

U.S. PATENT DOCUMENTS

| | | | |
|---|---|---|---|
| 2006/0028386 A1* | 2/2006 | Ebling | H01Q 13/24 |
| | | | 343/753 |
| 2007/0195004 A1* | 8/2007 | Rebeiz | H01Q 1/3233 |
| | | | 343/876 |
| 2008/0048921 A1* | 2/2008 | Rebeiz | H01Q 1/3233 |
| | | | 343/754 |
| 2008/0180965 A1* | 7/2008 | Nakamura | B60Q 1/0023 |
| | | | 362/507 |
| 2009/0267822 A1* | 10/2009 | Shinoda | G01S 13/4463 |
| | | | 342/70 |
| 2011/0279304 A1* | 11/2011 | Yonemoto | H01Q 19/062 |
| | | | 342/52 |
| 2012/0194377 A1* | 8/2012 | Yukumatsu | G01S 7/28 |
| | | | 342/368 |
| 2016/0020526 A1* | 1/2016 | Evtyushkin | H01Q 21/08 |
| | | | 343/756 |
| 2018/0136327 A1* | 5/2018 | Lee | G01S 13/931 |
| 2018/0205155 A1 | 7/2018 | Mizunuma et al. | |
| 2018/0246203 A1* | 8/2018 | Lee | G01S 7/032 |
| 2019/0302227 A1* | 10/2019 | Shiozaki | H01Q 1/3291 |
| 2020/0076479 A1* | 3/2020 | Rodnguez-Cano | H01Q 1/38 |
| 2020/0303839 A1* | 9/2020 | Kim | H01Q 21/08 |
| 2020/0395679 A1* | 12/2020 | Lim | H01Q 1/523 |
| 2022/0085497 A1* | 3/2022 | Khripkov | H01Q 21/067 |
| 2022/0102874 A1* | 3/2022 | Khripkov | H01Q 1/243 |

\* cited by examiner

RADAR APPARATUS

TECHNICAL FIELD

The present disclosure relates to a radar apparatus.

BACKGROUND ART

Non-contact radar apparatuses that use the frequency bands of millimeter waves and microwaves to detect the position of an object in a non-contact manner are known. The radar apparatus of this type is installed at the four corners of a vehicle body (vehicle), and is used for multi-directional surveillance, such as forward, front or rear surveillance, for example.

In recent years, for radar apparatuses of the above-mentioned type, the variety of applications in the apparatuses (e.g., vehicles) in which the radar apparatus is mounted have increased, and there is a demand for an apparatus with a wider detection range, such as an apparatus with an enhanced directivity in the lateral side of the vehicle.

For example, radar apparatuses of the above-mentioned type use an array antenna composed of a plurality of antenna elements to increase the directivity, but the wide angle performance of the array antenna is limited by the directivity of the antenna elements, which limits the directivity in the lateral side of the vehicle (see PTL 1).

For example, an adaptive array antenna composed of a plurality of patch antennas disposed in a flat region and a plurality of patch antennas disposed in an inclined region on a multilayer board is known in the known art. In this configuration, the lateral directivity is increased by the patch antennas disposed in the inclined region.

CITATION LIST

Patent Literature

PTL 1
WO2017/047396
PTL 2
Japanese Patent Application Laid-Open No. 2015-190809

SUMMARY OF INVENTION

However, radar apparatuses may be difficult to manufacture because the multilayer substrate is polished in the formation of the inclined region. In addition, radar apparatuses may also be more difficult to manufacture because the shape of the lens disposed in front of the antenna is adjusted to match the shape of the multilayer substrate.

Non-limiting examples of the present disclosure contribute to providing a radar apparatus that can be easily manufactured, and can increase lateral directivity.

A radar apparatus according to an embodiment of the present disclosure includes an antenna composed of an end-fire array antenna and including a plurality of antenna elements; and a circuit board in which the plurality of antenna elements is disposed side by side in a first direction. At least one of the plurality of antenna elements is parallel to a substrate surface of the circuit board. A directivity of at least one of the plurality of antenna elements is set to a third direction tilted with respect to the first direction and a second direction orthogonal to the first direction.

Advantageous Effects of Invention

According to the present disclosure, high manufacturability and high lateral directivity can be achieved.

DESCRIPTION OF EMBODIMENTS

Embodiment 1

Figure 1:
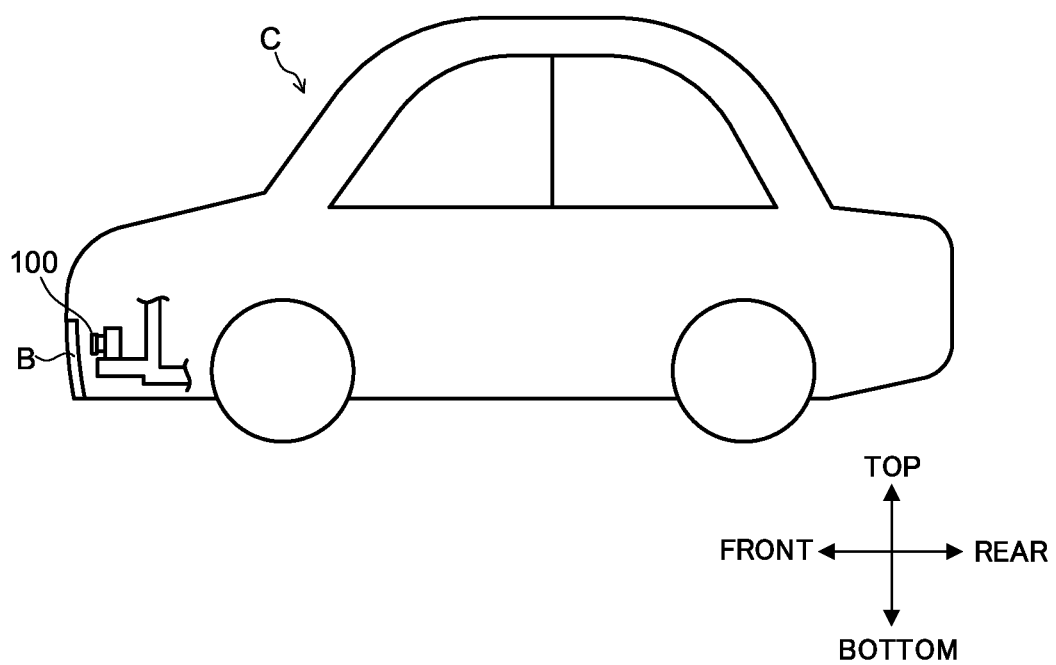
FIG. 1 is a diagram illustrating a vehicle equipped with a radar apparatus according to Embodiment 1 of the present disclosure.
Figure 2:
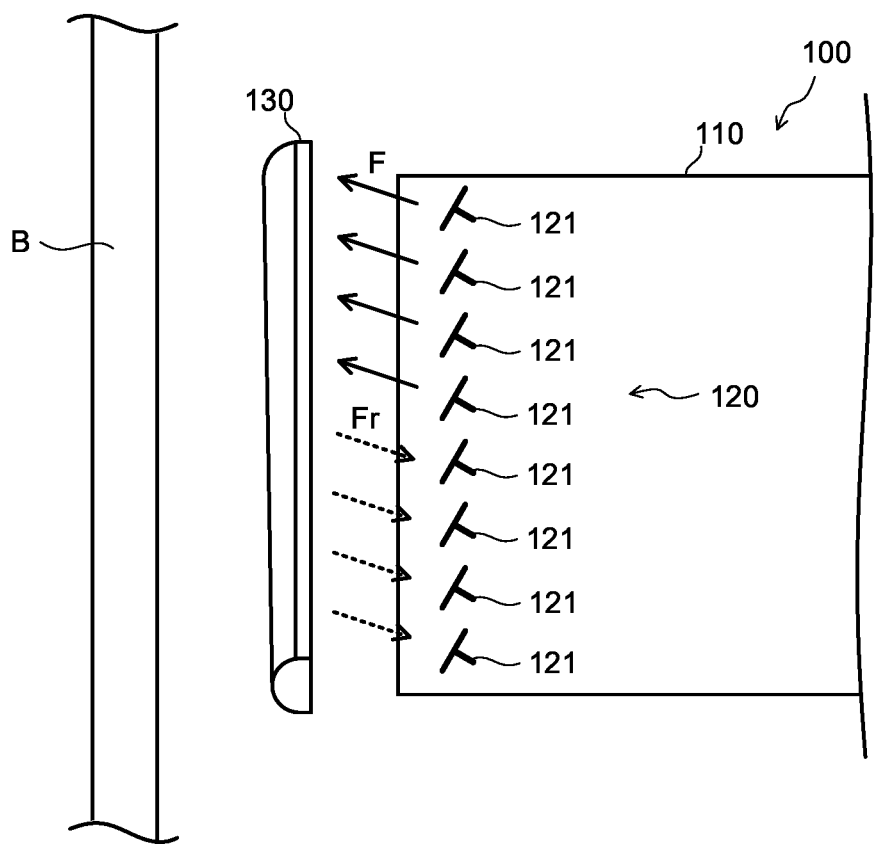
FIG. 2 is a plan view of the radar apparatus according to the embodiment.

Embodiment 1 of the present disclosure is elaborated below with reference to drawings. FIG. 1 is a diagram illustrating vehicle C equipped with radar apparatus 100 according to Embodiment 1 of the present disclosure. FIG. 2 is a plan view of radar apparatus 100 according to the present embodiment.

As illustrated in FIG. 1, radar apparatus 100 transmits and receives millimeter waves or electromagnetic waves having a frequency band higher than that of millimeter waves through cover member B of vehicle C and the like, for example. Radar apparatus 100 is provided at the four corners of the vehicle body, for example.

As illustrated in FIG. 2, radar apparatus 100 includes a housing (omitted in the drawing), circuit board 110, antenna part (antenna) 120, and lens 130. In FIG. 2, etc., radar apparatus 100 as viewed from the + side in the Z direction is illustrated.

Note that an orthogonal coordinate system (X, Y, Z) is used for describing a structure of radar apparatus 100 of the present embodiment. The drawings described later are also illustrated using the common orthogonal coordinate system (X, Y, Z).

In FIG. 2, solid arrows F indicate electromagnetic waves transmitted from a transmission antenna. In addition, dotted arrows Fr indicate reflected waves from a target. Note that in FIG. 2, the illustration of a structure for supporting radar apparatus 100 in vehicle C is omitted.

Radar apparatus 100 according to the present embodiment uses antenna part 120 disposed in the end region of circuit board 110 on the + side in the X direction to transmit and receive electromagnetic waves to and from the outside of the apparatus through lens 130 in a directive direction (a first inclination direction or a third direction described later) inclined with respect to the X direction approximately parallel to the substrate surface of the circuit board 110. That is, in radar apparatus 100 according to the present embodiment, circuit board 110 is disposed such that the extending direction of the substrate surface crosses (e.g., at a right angle) the extending direction of cover member B.

With such a configuration, radar apparatus 100 according to the present embodiment reduces a situation where reflected waves reflected by cover member B are reflected multiple times at circuit board 110 and the like to cause interference with reflected waves from a target, and a situation where such reflected waves impinge on antenna part 120 as diffraction waves.

Circuit board 110 is a board on which antenna part 120, signal processing IC, a connector, and the like are mounted. In circuit board 110, antenna part 120, signal processing IC, the connector and the like are mounted, and wiring lines (not illustrated) for electrically connecting the mounted elements (antenna part 120, signal processing IC, the connector and the like) are patterned.

Circuit board 110 is disposed such that the substrate surface is parallel to the XY plane.

For example, the material of circuit board 110 may be, but not limited thereto in the present disclosure, a printed circuit board (PCB). Note that typically, circuit board 110 has a flat plate shape.

Figure 3A:
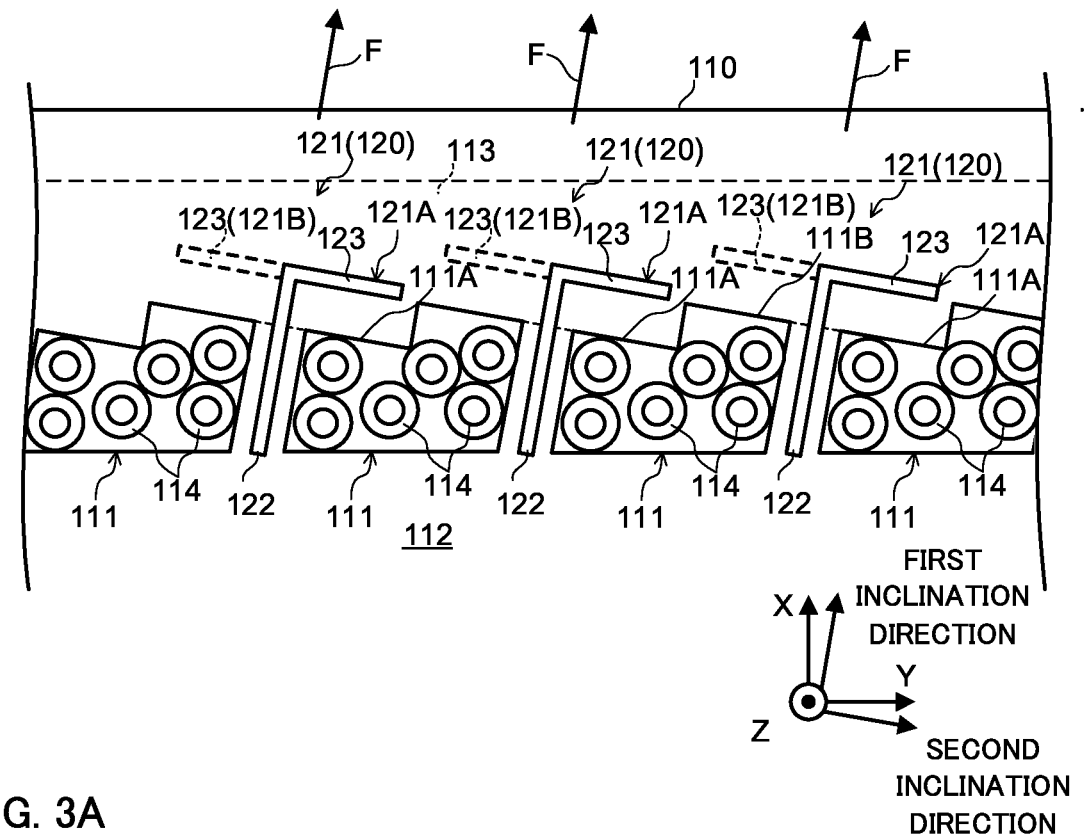
FIG. 3A is an enlarged plan view of an antenna element portion in the radar apparatus.
Figure 3B:
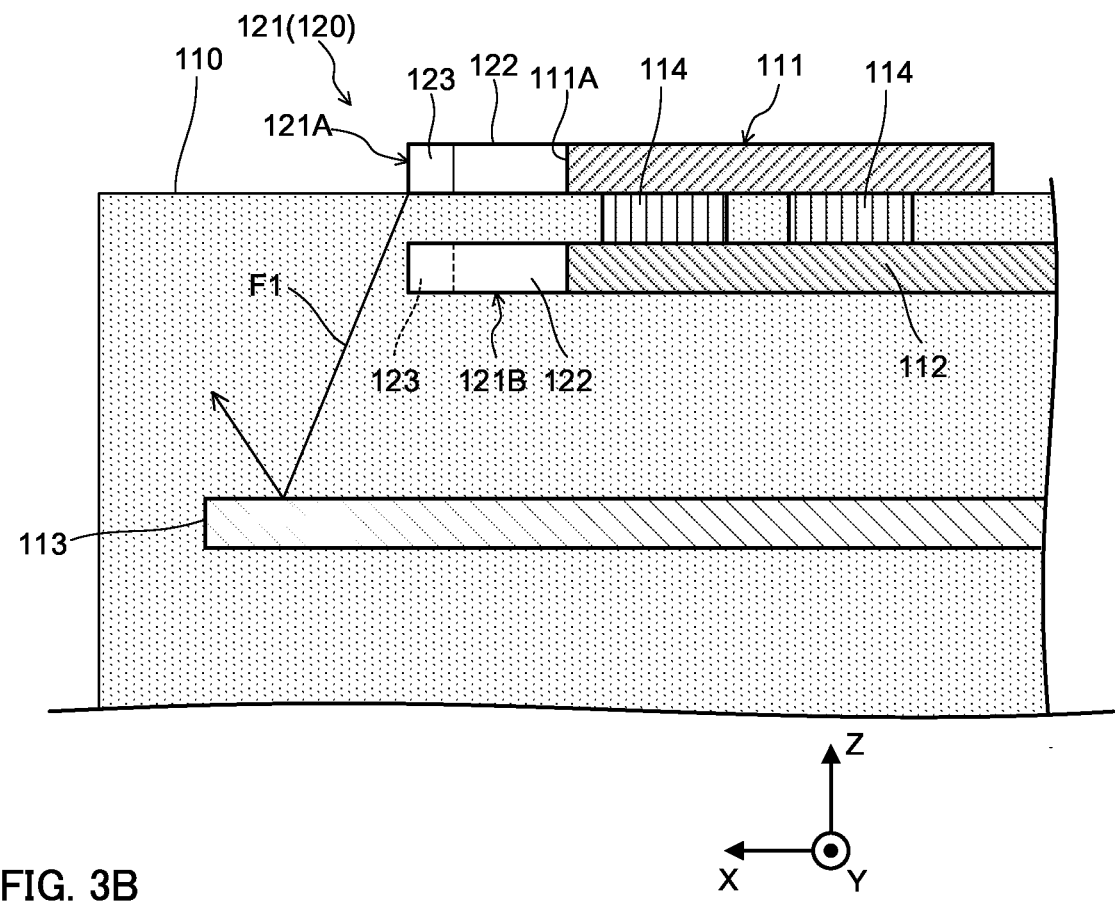
FIG. 3B is a side sectional view of the radar apparatus.

As illustrated in FIGS. 3A and 3B, circuit board 110 includes surface layer member 111, inner layer member 112, and reflection member 113. Surface layer member 111 is a conductor disposed at the surface of circuit board 110. A plurality of surface layer members 111 are disposed side by side in the Y direction in such a manner as to sandwich strip conductors 122 of a plurality of first elements 121A described later.

In addition, the end portion of each surface layer member 111 in the X direction includes first end portion 111A and second end portion 111B in a step shape.

First end portion 111A is disposed parallel to protrusion element 123 of first element 121A described later. Second end portion 111B is disposed to protrude over first end portion 111A in the X direction, and is disposed parallel to protrusion element 123 of second element 121B described later.

Inner layer member 112 is a conductor provided inside circuit board 110, and is disposed on the − side of surface layer member 111 in the Z direction. Inner layer member 112 is connected to the ground.

In addition, the end portion of inner layer member 112 in the X direction has substantially the same shape as the end portion of surface layer member 111 in the X direction.

Surface layer member 111 and inner layer member 112 are electrically connected to each other through via 114. In this manner, first end portion 111A of surface layer member 111 in the X direction functions as a reflection surface configured to reflect electromagnetic waves radiated from antenna part 120. First end portion 111A corresponds to "first reflection part" of the present disclosure.

Reflection member 113 is disposed on the − side of inner layer member 112 in the Z direction inside circuit board 110. Reflection member 113 is disposed in the range protruding to the + side in the X direction than the end portions of surface layer member 111 and inner layer member 112.

Reflection member 113 has a function of reflecting the electromagnetic waves when electromagnetic waves transmitted by antenna part 120 advance to the − side in the Z direction (see arrow F1 of FIG. 3B). Reflection member 113 corresponds to "second reflection part" of the present disclosure.

As illustrated in FIG. 2, antenna part 120 is disposed in an end region of circuit board 110 on the + side in the X direction, and includes a plurality of antenna elements 121. The plurality of antenna elements 121 is disposed side by side in the Y direction. In the example illustrated in FIG. 2, a total of eight antenna elements 121 is provided. The Y direction corresponds to "first direction" of the present disclosure.

Four antenna elements 121 disposed in the region on the + side in the Y direction in circuit board 110 are antenna elements for transmission, and transmit electromagnetic waves parallel to the substrate surface of circuit board 110 toward the + side in the X direction of circuit board 110.

In addition, four antenna elements 121 are antenna elements for reception disposed in the region on the − side in the Y direction in circuit board 110, and receive reflected waves from the + side in the X direction of circuit board 110.

With such an arrangement, antenna part 120 has a directivity of transmission and reception on the + side in the X direction (first inclination direction) of circuit board 110.

Typically, an end-fire array antenna having a directivity to the + side in the X direction of circuit board 110 is applied as antenna part 120. Note that an end-fire array antenna includes a plurality of strip conductors whose longitudinal sides are parallel to each other, and transmits and receives electromagnetic waves along a direction in which the plurality of strip conductors is disposed.

Electromagnetic waves transmitted by antenna elements 121 for transmission are converted at lens 130 to plane waves, and are output toward the + side in the X direction (here, approximately horizontal direction) outside radar apparatus 100. In addition, returning reflected waves that are electromagnetic waves transmitted by antenna elements 121 for transmission and reflected by a target outside the apparatus are collected at lens 130 and output to antenna element 121 for reception. Note that each antenna element 121 is connected to signal processing IC through a wiring line formed on circuit board 110.

As illustrated in FIGS. 3A and 3B, antenna element 121 includes first element 121A and second element 121B. First element 121A and second element 121B have an L-shape composed of strip conductor 122 and protrusion element 123.

Strip conductor 122 in first element 121A is disposed along the first inclination direction that is tilted with respect to the X direction and the Y direction and is in parallel to circuit board 110. The X direction corresponds to "second direction" of the present disclosure. The first inclination direction corresponds to "third direction" of the present disclosure. The strip conductor 122 corresponds to "first portion" of the present disclosure.

In addition, the above-mentioned two surface layer members 111 sandwiching strip conductor 122 therebetween are disposed with an equal distance from strip conductor 122.

Strip conductor 122 in second element 121B protrudes in the first inclination direction from the end portion of inner layer member 112 in the Y direction. Strip conductor 122 of second element 121B is disposed at a position that overlaps strip conductor 122 of first element 121A as viewed in the Z direction.

Protrusion element 123 is disposed along a second inclination direction parallel to circuit board 110 and orthogonal to the first inclination direction from the end portion of strip conductor 122 on the + side in the X direction. Protrusion element 123 in first element 121A extends to the + side in the second inclination direction. Protrusion element 123 in the second element 121B extends to the − side in the second inclination direction. The second inclination direction corresponds to "fourth direction" of the present disclosure. The protrusion element 123 corresponds to "second portion" of the present disclosure.

That is, the plurality of antenna elements 121 is disposed to radiate electromagnetic waves in the first inclination direction (see arrow F of FIG. 3A).

With such an arrangement, antenna part 120 can achieve a high directivity to the + side in the Y direction (lateral directivity) in comparison with a configuration in which the strip conductors are disposed along the X direction.

Figure 4:
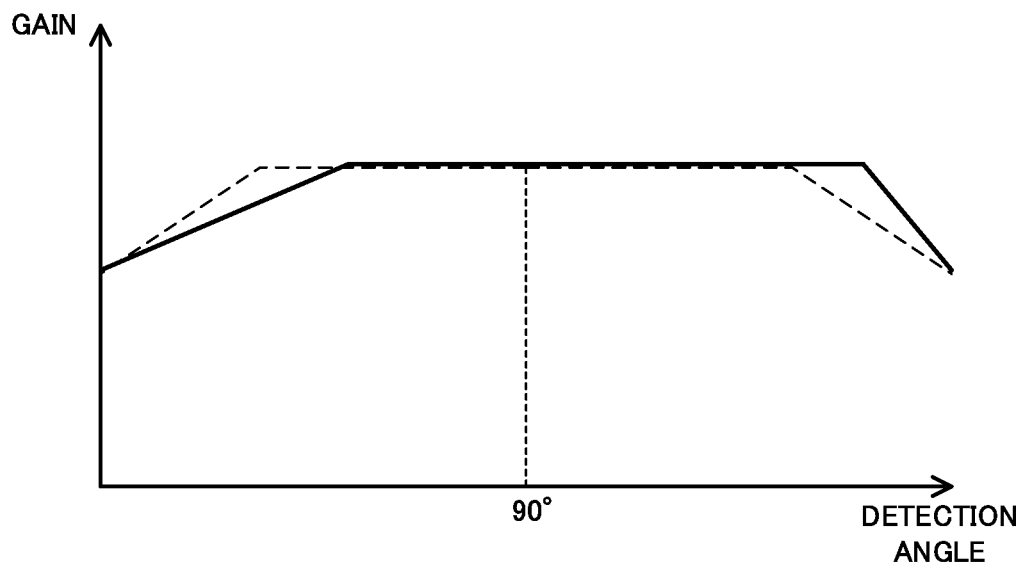
FIG. 4 is a diagram illustrating a relationship between a detection angle and a gain in the radar apparatus.

For example, as illustrated in FIG. 4, with a configuration in which strip conductors are disposed along the X direction, the gain of the antenna part has a trapezoidal shape that is symmetrical about the detection angle of 90° (see the broken line).

In contrast, in antenna part 120 according to the present embodiment, the directivity of the electromagnetic waves is shifted to the + side (e.g., side greater than 90°) in the Y direction, and thus the gain is obtained in such a manner that the directivity is biased to the side greater than 90°. That is, antenna part 120 according to the present embodiment can achieve a high directivity in a lateral side (the + side in the Y direction).

In addition, as illustrated in FIGS. 3A and 3B, the above-described surface layer member 111 is disposed on circuit board 110 together with first element 121A, and therefore protrusion element 123 of first element 121A and first end portion 111A of surface layer member 111 are disposed opposite to each other. That is, first end portion 111A of surface layer member 111 is disposed opposite to the first inclination direction with respect to protrusion element 123 of first element 121A.

As described above, surface layer member 111 is electrically connected to inner layer member 112 through via 114, and thus first end portion 111A functions as a reflection surface that reflects electromagnetic waves radiated from protrusion element 123.

Thus, when electromagnetic waves are radiated to the − side in the X direction from antenna part 120, the electromagnetic waves can be reflected by first end portion 111A of surface layer member 111 toward the first inclination direction. In addition, for example, in the case where the surface layer member is not in parallel to the protrusion element of the first element, the protrusion element and the surface layer member may cause interference depending on the inclination angle of the strip conductor with respect to the Y direction.

In contrast, in the present embodiment, surface layer member 111 is in parallel to protrusion element 123 of first element 121A, and thus the interference of protrusion element 123 and surface layer member 111 can be suppressed.

Figure 5:
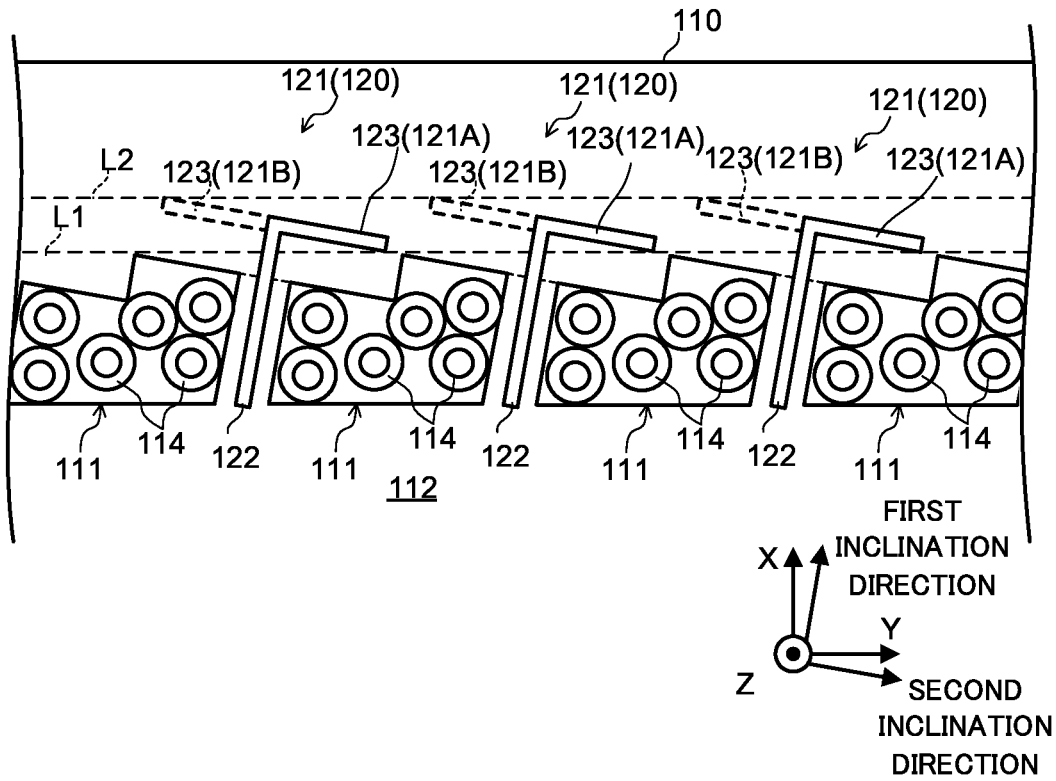
FIG. 5 is an enlarged plan view of the antenna element portion in the radar apparatus.

In addition, as illustrated in FIG. 5, the end portions of protrusion elements 123 of the plurality of first elements 121A on the + side in the Y direction are disposed at the same position in the X direction. In other words, the end portions of protrusion elements 123 of the plurality of first elements 121A on the + side in the Y direction are disposed on straight line L1 parallel to the Y direction at a first predetermined position in the X direction. In this manner, the performances of the elements can be equalized.

In addition, the end portions of protrusion elements 123 of the plurality of second elements 121B on the − side in the Y direction are disposed at the same position in the X direction. In other words, the end portions of protrusion elements 123 of the plurality of second elements 121B on the − side in the Y direction are disposed on straight line L2 parallel to the Y direction at a second predetermined position in the X direction.

In addition, lens 130 is disposed on the + side of antenna part 120 in the X direction. Lens 130 narrows the beam of electromagnetic waves transmitted by antenna elements 121 for transmission, and outputs it to the region on the + side in the Y direction outside the apparatus. Then, lens 130 collects returning reflected waves that are the transmitted electromagnetic waves reflected by a target, and outputs the waves to antenna element 121 for reception. Note that, more preferably, lens 130 has a configuration of narrowing the beam of electromagnetic waves transmitted by antenna elements 121 for transmission such that the electromagnetic waves are converted to plane waves.

Lens 130 also functions as a radome for protecting antenna part 120 while improving the gain when antenna part 120 transmits and receives electromagnetic waves.

Typically, as lens 130, a single-sided convex lens with a convex surface on the + side in the X direction may be applied. It should be noted that, as lens 130, a double-sided convex lens, a ball lens, a Fresnel lens, or a combination of them, or, a combination of them and a concave lens and the like may be applied. In addition, lens 130 may also have a convex shape on the − side in the X direction.

The material of lens 130 is not limited as long as the function of the lens can be achieved, and examples of the material of lens 130 include acrylic resins, tetrafluoride ethylene resins, polystyrene resins, polycarbonate resins, poly butylene terephthalate resins, polyphenylene resins, polypropylene resins, syndiotactic polystyrene resins, and ABS resins.

An operational effect of radar apparatus 100 according to the present embodiment having the above-mentioned configuration is described below.

Figure 6:
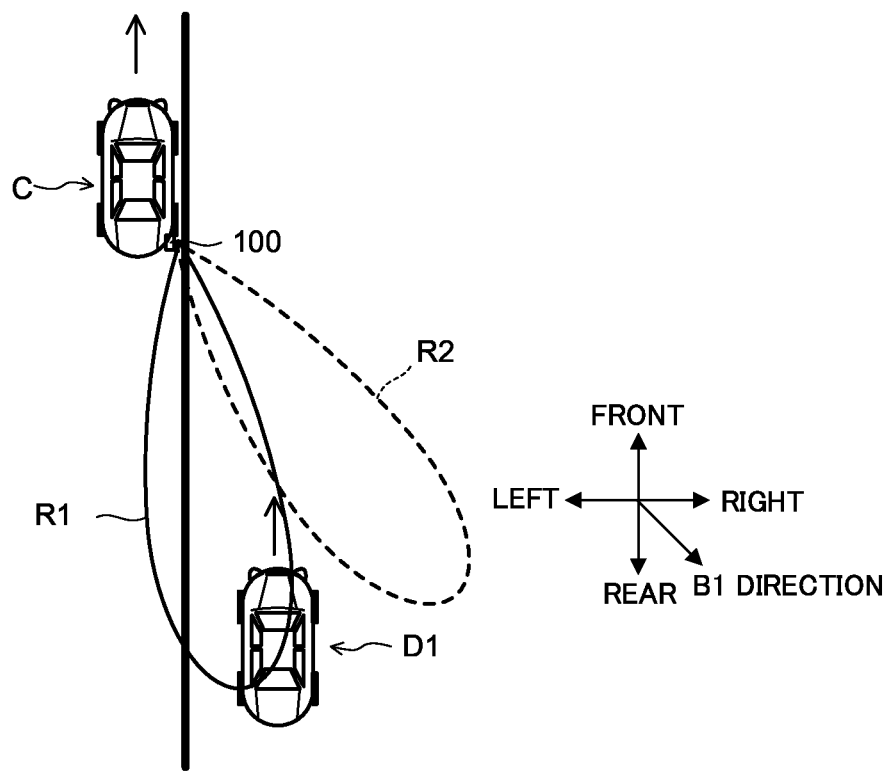
FIG. 6 is a diagram for describing an exemplary operational effect of the radar apparatus.

Assume that as illustrated in FIG. 6, vehicle C equipped with radar apparatus 100 is changing the lane to the adjacent right side lane on the right side of the currently traveling lane for example. In this case, on radar apparatus 100 mounted in a right rear part of vehicle C is used as an apparatus for detecting approaching vehicles behind during lane change. In this case, radar apparatus 100 is disposed such that the right oblique backward direction of vehicle C (B1 direction) is the + side in the X direction. The detection range R1 of radar apparatus 100 falls within a range on the right rear side of vehicle C, for example. When other vehicle D1 travelling on the right side lane enters this detection range R1, the vehicle D1 is detected by radar apparatus 100.

In the present embodiment, for example, antenna element 121 is tilted with respect to the B1 direction and the rear direction such that the gain of a direction tilted with respect to the B1 direction of vehicle C (a direction between the B1 direction and the rear direction) increases. In this manner, in comparison with detection range R2 (see the broken line) of the configuration in which antenna element 121 is not tilted, the detection range R1 of radar apparatus 100 on the right rear side can be tilted to the left oblique rear side (see the solid line). As a result, the detection range on the rear side of vehicle C in the right side lane is broadened, and other vehicle D1 travelling on the right side lane can be easily detected.

Figure 7:
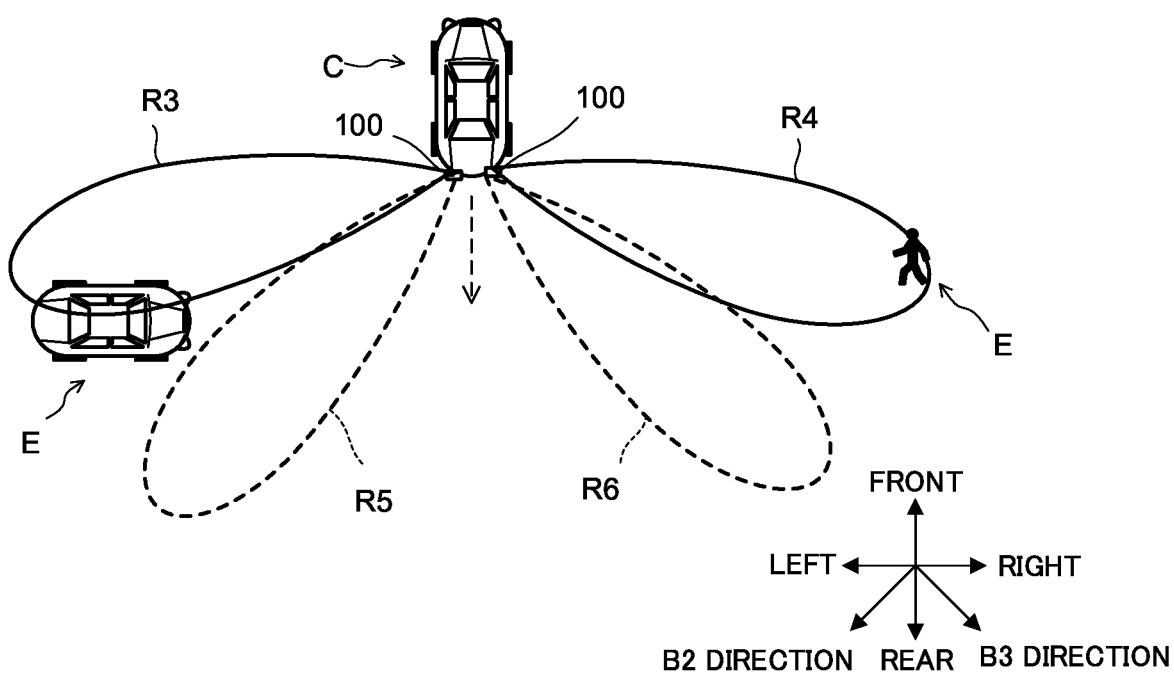
FIG. 7 is a diagram for describing an exemplary operational effect of the radar apparatus.

In addition, assume that as illustrated in FIG. 7, vehicle C equipped with radar apparatus 100 is moving backward from the parking space to get out of a parking park or the like, for example. In this case, radar apparatuses 100 mounted at both rear ends of vehicle C are used as apparatuses for rearward detection during the rearward movement out of the shed. In this case, radar apparatus 100 disposed such that the left oblique rear direction of vehicle C (B2 direction) is the + side in the X direction, and radar apparatus 100 disposed such that the right oblique backward direction of vehicle C (B3 direction) is the + side in the X direction are provided. Detection ranges R3 and R4 of radar apparatus 100 are the ranges on the left and right sides of the lateral rear side of vehicle C, for example. When moving objects E (such as a pedestrian and another vehicle) on the left and right sides of the lateral rear side of vehicle C or the like enter the detection ranges R3 and R4, moving objects E are detected by radar apparatus 100.

In the present embodiment, each antenna element 121 is tilted such that the gain of a direction tilted with respect to B2 direction of vehicle C (a direction between B2 direction and the left direction) and the gain of a direction tilted with respect to B3 direction (a direction between B3 direction and the right direction) increase, for example. In this manner, in comparison with ranges R5 and R6 (see the broken line) of a configuration in which antenna element 121 is not tilted, detection ranges R3 and R4 of radar apparatus 100 can be tilted to oblique front directions (see the solid line) on the left and right sides of the lateral rear side. As a result, the detection range on the lateral rear side of vehicle C is broadened, and moving objects E on the left and right sides on the lateral rear side of vehicle C can be easily detected.

Figure 8:
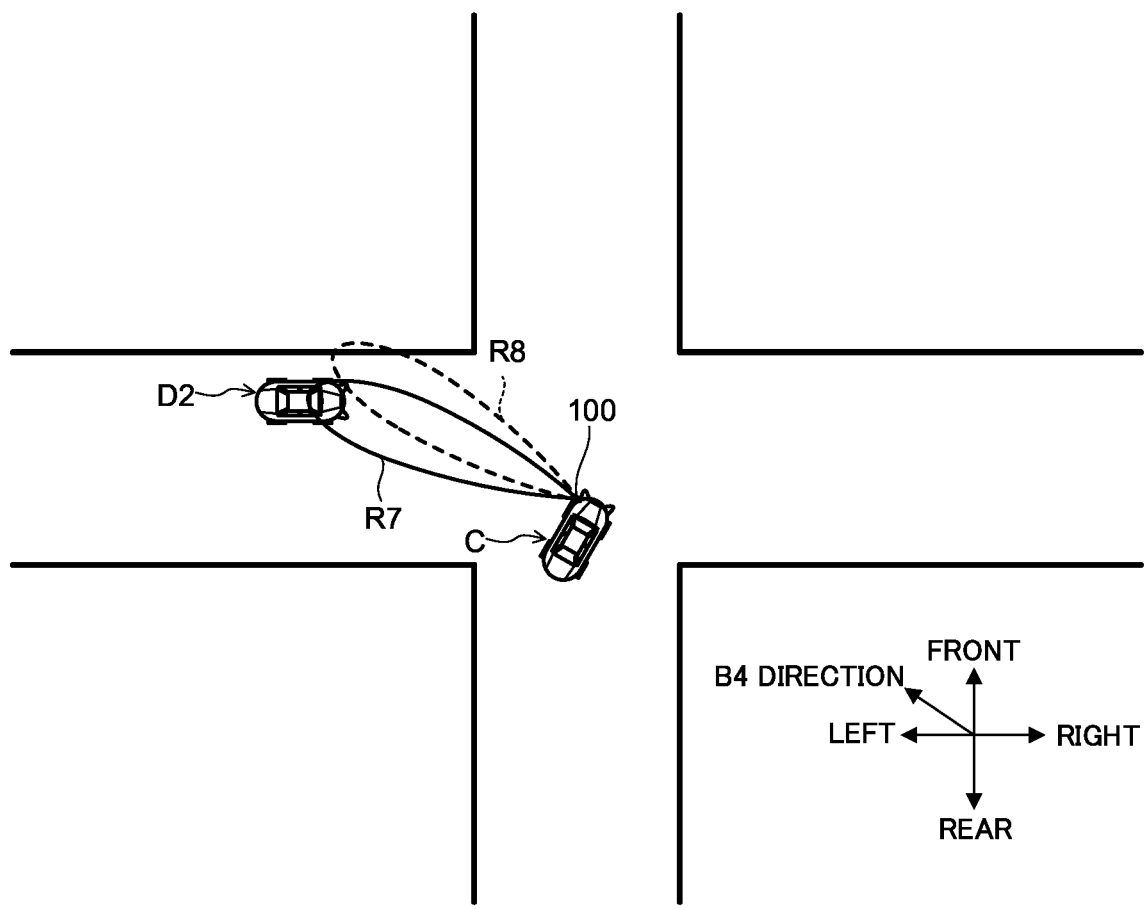
FIG. 8 is a diagram for describing an exemplary operational effect of the radar apparatus.

In addition, assume that as illustrated in FIG. 8, vehicle C equipped with radar apparatus 100 is turning right at an intersection, for example. In this case, when vehicle C is waiting for the right turn, radar apparatus 100 mounted at the front left end of vehicle C detects a moving object in the region on front left side of vehicle C (e.g., other vehicle D2 waiting for a signal in the lane where the right turn is to be made). In this case, radar apparatus 100 is disposed such that the leftward direction of vehicle C (B4 direction of FIG. 8) is the + side in the X direction. Detection range R7 of radar apparatus 100 is a range on the front left side of vehicle C, for example.

In the present embodiment, antenna element 121 is tilted such that the gain on the left oblique rear side of vehicle C (a direction between B4 direction and left direction) is improved. In this manner, in comparison with detection range R8 (see the broken line) of a configuration in which antenna element 121 is not tilted, detection range R7 of radar apparatus 100 on the left rear side of vehicle C can be tilted (see the solid line). As a result, when vehicle C is waiting for the right turn, the detection range on the left oblique rear side of vehicle C is broadened, and a moving object and the like on the left oblique rear side of vehicle C can be easily detected.

As described above, in the present embodiment, the lateral directivity of radar apparatus 100 can be increased by disposing antenna element 121 so as to radiate electromagnetic waves in the first inclination direction tilted with respect to the Y direction. As a result, the detection range of radar apparatus 100 can be broadened, and the detection rate of objects on the lateral sides can be improved.

In addition, antenna part 120 of the present embodiment is composed of an end-fire array antenna, and it can be configured simply by disposing the antenna element 121 on an ordinary circuit board 110, which has not been specially processed.

For example, a configuration in which a patch antenna is disposed on a circuit board as disclosed in PTL 1 causes problems with manufacture of the apparatus, such as the necessity of polishing of the circuit board.

In the present embodiment, it can be configured by only disposing antenna element 121 on ordinary circuit board 110, and thus it is not necessary to change a simple structure of circuit board 110. As a result, radar apparatus 100 can be easily manufactured.

That is, in the present embodiment, high manufacturability and high lateral directivity can be achieved. In addition, since it is not necessary to have a complicated structure, such as polishing of circuit board 110, the manufacturing cost can be reduced.

In addition, with the configuration disclosed in PTL 1, the circuit board has a special shape such as a trapezoidal shape due to polishing of the circuit board, and consequently, when a lens is provided thereto, it is necessary to adjust the lens to the shape of the circuit board.

In contrast, in the present embodiment, since antenna part 120 is composed of an end-fire array antenna, a lens having a simple shape such as a single-sided convex lens may be employed as lens 130. As a result, the shape of radar apparatus 100 can be simplified in its entirety, and thus the manufacturability of radar apparatus 100 can be further increased.

Figure 9:
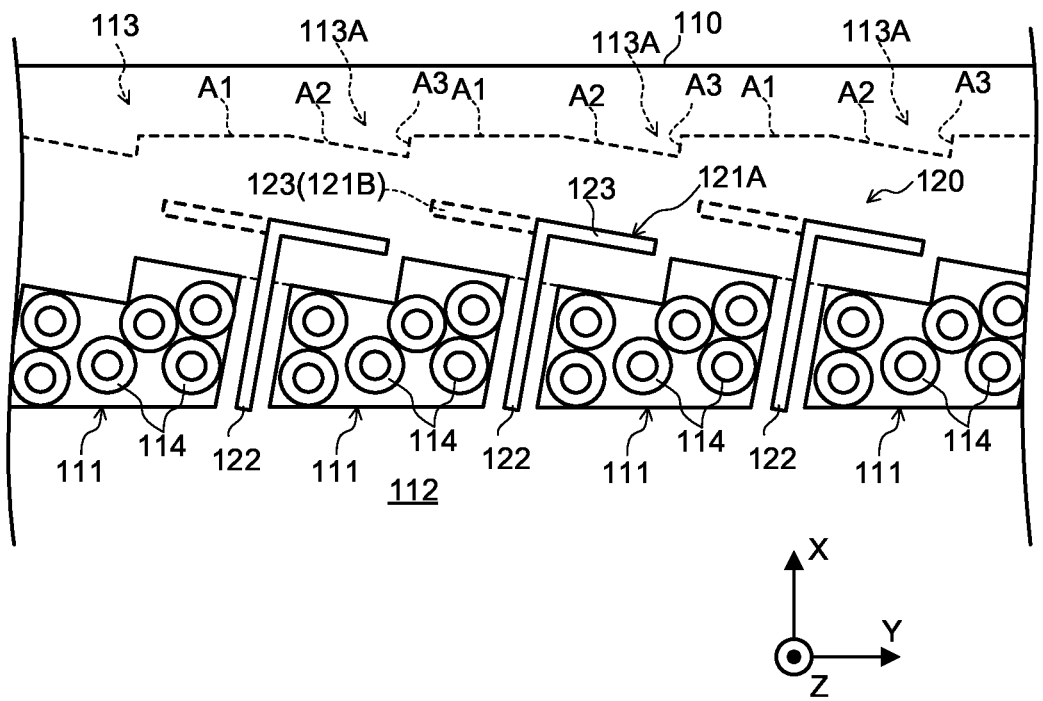
FIG. 9 is an enlarged plan view of an antenna element portion in a radar apparatus according to a modification.

Note that while the shape of reflection member 113 of circuit board 110 is not described in the present embodiment, a cutout may be provided in reflection member 113 as illustrated in FIG. 9.

To be more specific, the end portion of reflection member 113 in the X direction is provided with cutout portion 113A that is cut out to be recessed to the antenna element 121 side. Cutout portion 113A is provided for each antenna element 121. At the end portion of reflection member 113 in the X direction, the portion corresponding to one antenna element 121 is composed of first side A1, second side A2, and third side A3.

First side A1 is parallel to the Y direction, and is provided at a position corresponding to protrusion element 123 of second element 121B. Second side A2 extends from an end portion of first side A1 on the + side in the Y direction, in a direction (the − side in the X direction) parallel to protrusion element 123 of first element 121A. Third side A3 extends from an end portion of second side A2 on the + side in the Y direction, in a direction orthogonal to second side A2 (to the side away from antenna element 121). Third side A3 is connected to first side A1 of a region adjacent thereto on the + side in the Y direction.

Cutout portion 113A is composed of second side A2 and third side A3. With such a configuration, the reflection region of electromagnetic waves radiated from protrusion element 123 of first element 121A can be a relatively narrow region, for example.

If the reflection region is broadened, electromagnetic waves may be excessively reflected at reflection member 113, and therefore, by setting the reflection region to a relatively small size, excessive reflection of reflected waves can be suppressed.

Figure 10:
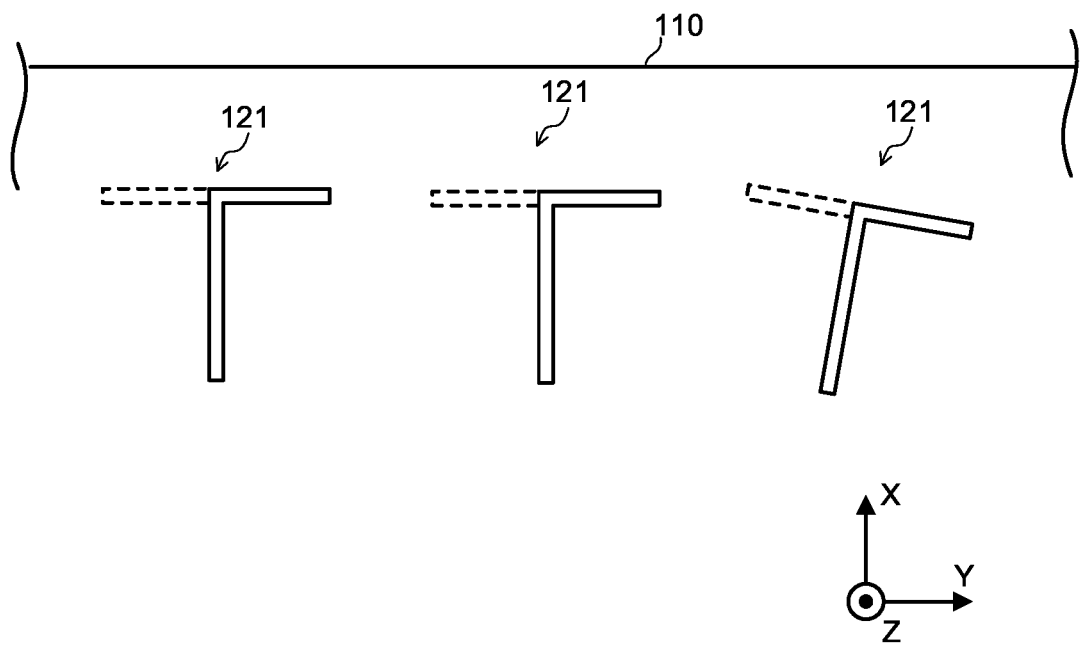
FIG. 10 is an enlarged plan view of an antenna element portion in a radar apparatus according to a modification.

In addition, while antenna elements 121 are configured to radiate electromagnetic waves in the same direction in the present embodiment, the present disclosure is not limited to this, and some antenna elements 121 may radiate electromagnetic waves in the first inclination direction as illustrated in FIG. 10 for example. In FIG. 10, antenna element 121 on the + side in the Y direction is disposed to radiate electromagnetic waves in the right oblique upward direction in FIG. 10. In addition, the remaining antenna elements 121 are disposed to radiate electromagnetic waves in the X direction.

Figure 11:
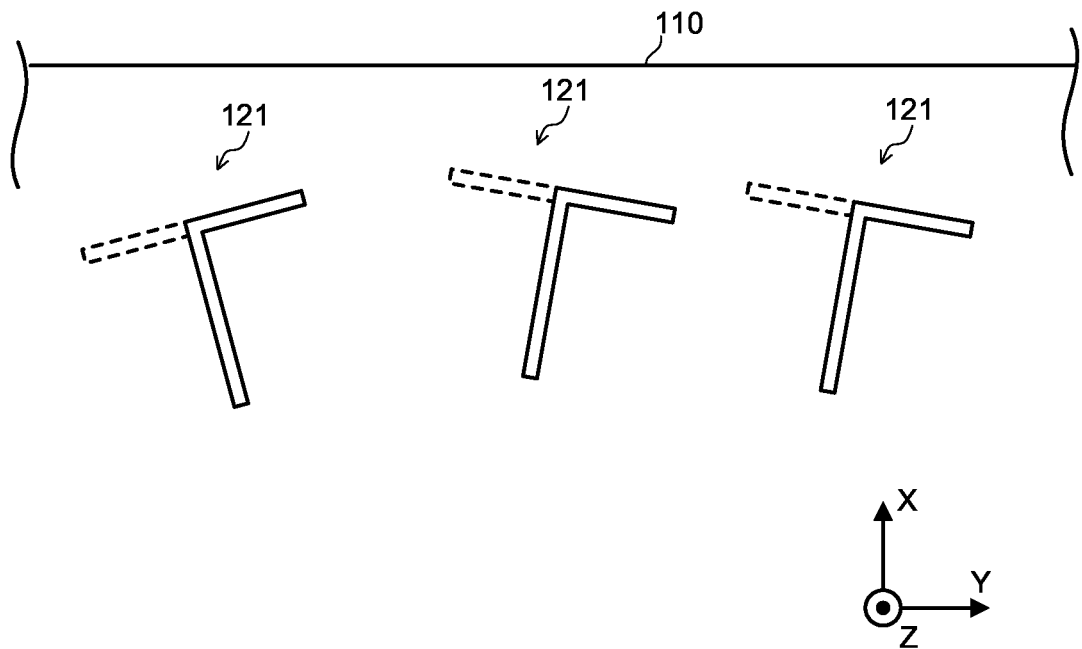
FIG. 11 is an enlarged plan view of an antenna element portion in a radar apparatus according to a modification.

In addition, as illustrated in FIG. 11, the plurality of antenna elements 121 may be disposed to radiate electromagnetic waves in different inclination directions. In FIG. 11, antenna element 121 on the + side in the Y direction and antenna element 121 at the center in the Y direction are disposed to radiate electromagnetic waves in the right oblique upward direction in FIG. 11. In addition, antenna element 121 on the − side in the Y direction is disposed to radiate electromagnetic waves in the left oblique upward direction in FIG. 11.

Figure 12:
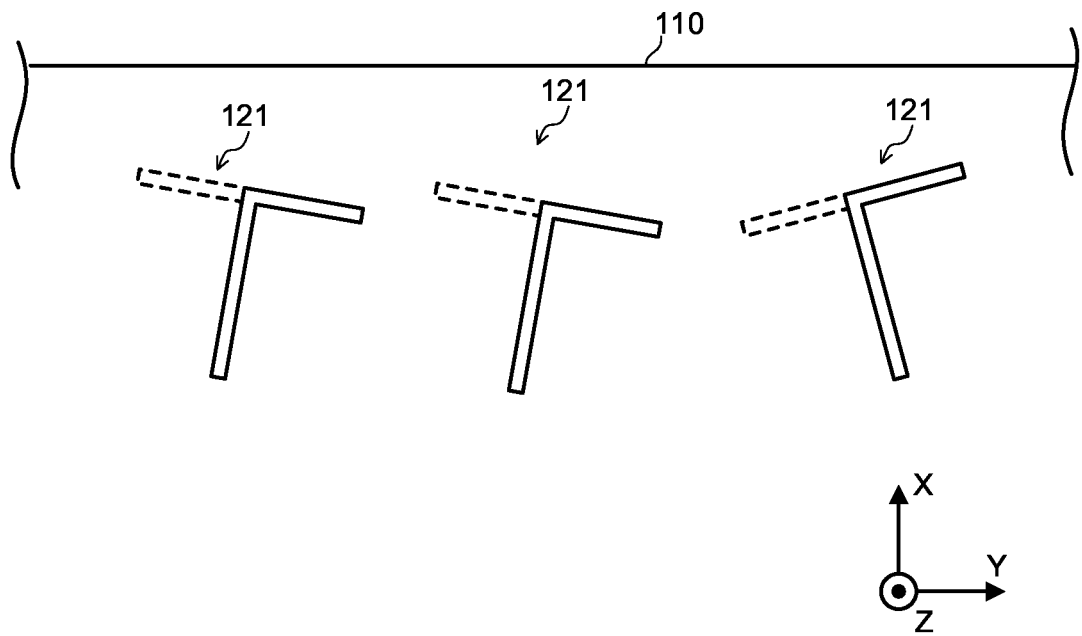
FIG. 12 is an enlarged plan view of an antenna element portion in a radar apparatus according to a modification.

In addition, as illustrated in FIG. 12, two of the plurality of antenna elements 121 may be disposed to radiate electromagnetic waves to the sides facing each other. In FIG. 12, antenna element 121 on the + side in the Y direction is disposed to radiate electromagnetic waves in the left oblique upward direction in FIG. 12. In addition, antenna element 121 on the − side in the Y direction and antenna element 121 at the center in the Y direction are disposed to radiate electromagnetic waves in the right oblique upward direction.

In addition, while antenna element 121 for reception is tilted in the same manner as antenna elements 121 for transmission in the present embodiment, the present disclosure is not limited to this, and antenna element 121 for reception may not be tilted.

In addition, while first end portion 111A of surface layer member 111 is disposed parallel to protrusion element 123 in the present embodiment, the present disclosure is not limited to this, and first end portion 111A of surface layer member 111 may not be parallel to protrusion element 123.

In addition, while reflection member 113 is provided in the present embodiment, the present disclosure is not limited to this, and the reflection member may not be provided.

Embodiment 2

The present disclosure relates to a radar apparatus.

In recent years, this type of radar apparatus is required to have a wide detection range due to the diversity of applications in apparatuses (e.g., vehicles) in which the radar apparatus is mounted.

For example, a radar apparatus composed of a combination of a lens antenna and an array antenna is known. A radar apparatus of this type uses the lens antenna to detect a distant region, and uses the array antenna to detect a neighboring region (see PTL2).

Incidentally, some radar apparatuses of such a type increases the gain of wide angle to create further wider beam. For such a purpose, in the configuration of the radar apparatus disclosed in PTL2, the size of the lens antenna is increased in some situation to ensure both the distance to the distant region and the detection range. If the size of the lens antenna is increased in a radar apparatus of the type, however, the influence of multiple reflection may be increased due to reflection of electromagnetic waves through the cover member of the bumper.

Non-limiting examples of the present disclosure contribute to providing a radar apparatus that can broaden the detection range and can reduce the influence of multiple reflection.

Description of Embodiment 2

Figure 13:
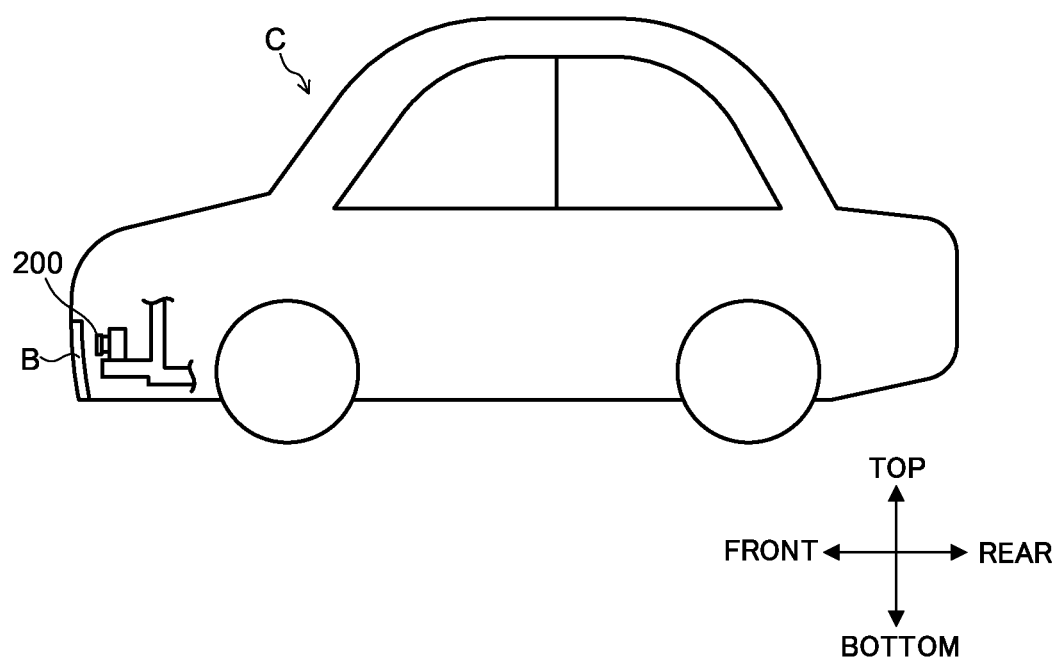
FIG. 13 is a diagram illustrating a vehicle equipped with a radar apparatus according to Embodiment 2 of the present disclosure.
Figure 14:
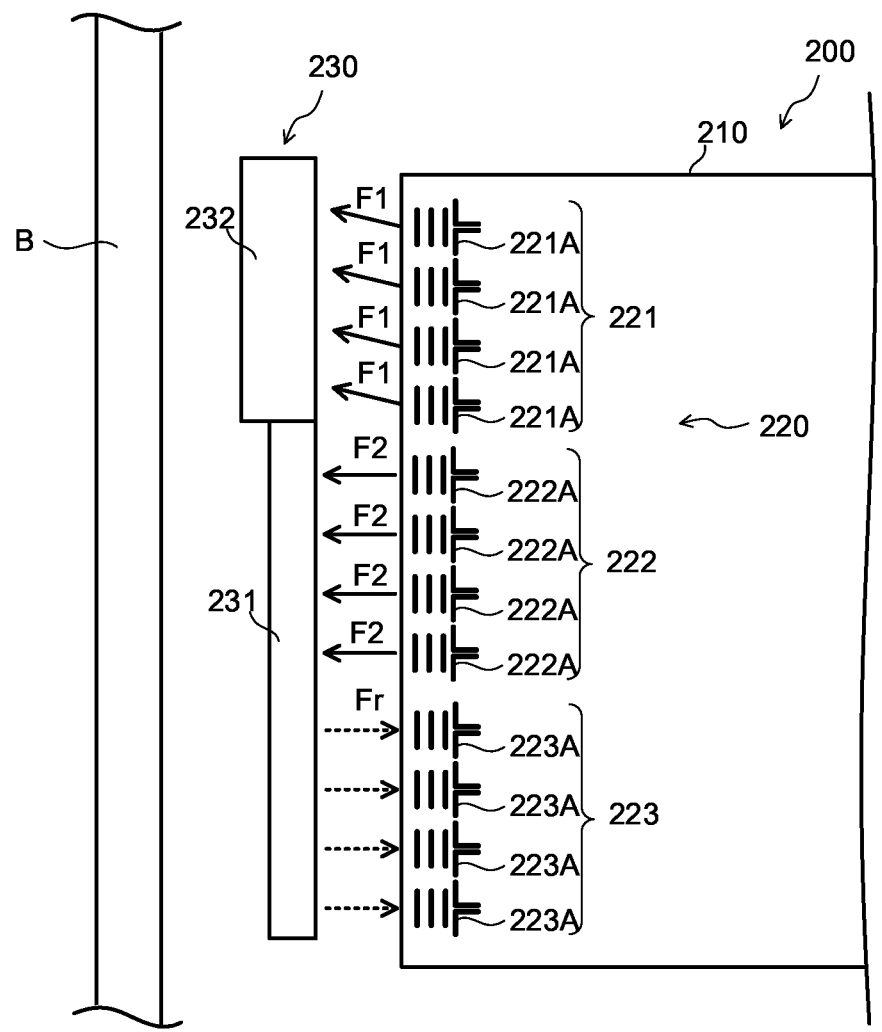
FIG. 14 is a plan view of the radar apparatus according to Embodiment 2.

Next, Embodiment 2 of the present disclosure is elaborated below with reference to the drawings. FIG. 13 is a drawing illustrating vehicle C equipped with radar apparatus 200 according to Embodiment 2 of the present disclosure. FIG. 14 is a plan view of radar apparatus 200 according to Embodiment 2.

As illustrated in FIG. 13, radar apparatus 200 transmits and receives millimeter waves or electromagnetic waves having a frequency band higher than that of millimeter waves through cover member B of vehicle C and the like, for example. Radar apparatus 200 is provided at the four corners of the vehicle body, for example.

As illustrated in FIG. 14, radar apparatus 200 includes a housing (omitted in the drawing), circuit board 210, antenna part (antenna) 220, and lens part 230. In FIG. 14, etc., radar apparatus 200 as viewed from the + side in the Z direction is illustrated.

Note that an orthogonal coordinate system (X, Y, Z) is used for description of the structure of radar apparatus 200 of Embodiment 2. The drawings described later are also illustrated using the common orthogonal coordinate system (X, Y, Z).

Solid arrows F1 and F2 of FIG. 14 indicate electromagnetic waves transmitted by antenna part 220. In addition, dotted arrows Fr indicate reflected waves from a target. Note that in FIG. 14, illustration of a structure for supporting radar apparatus 200 in vehicle C is omitted. In addition, in the following description, electromagnetic waves transmitted by antenna part 220 are referred to also as transmission waves.

Radar apparatus 200 according to Embodiment 2 uses antenna part 220 disposed in the end region of circuit board 210 on the + side in the X direction to transmit and receive electromagnetic waves to and from the outside of the apparatus through lens part 230 in a directive direction set to the + side in the X direction approximately parallel to the substrate surface of the circuit board 210. That is, in radar apparatus 200 according to Embodiment 2, circuit board 210 is disposed such that the extending direction of the substrate surface crosses (e.g., at a right angle) the extending direction of cover member B.

Circuit board 210 is a board on which antenna part 220, signal processing IC, the connector and the like are mounted. In circuit board 210, antenna part 220, signal processing IC, the connector and the like are mounted, and wiring lines (not illustrated) for electrically connecting mounted elements (antenna part 220, signal processing IC, the connector and the like) are patterned.

Circuit board 210 is disposed such that the substrate surface is parallel to the XY plane.

The material of circuit board 210 may be, but not limited thereto in the present disclosure, a printed circuit board (PCB), for example. Note that typically, circuit board 210 has a flat plate shape.

Antenna part 220 is disposed in the end region of circuit board 210 on the + side in the X direction, and includes first transmission antenna part 221, second transmission antenna part 222, and reception antenna part 223.

First transmission antenna part 221 configures a transmission array composed of a plurality of antenna elements 221A, and is disposed in an end portion of circuit board 210 on the + side in the Y direction. FIG. 14 is a diagram illustrating an example in which four antenna elements 221A are provided. First transmission antenna part 221 corresponds to "first transmission array" of the present disclosure.

First transmission antenna part 221 transmits electromagnetic waves parallel to the substrate surface of circuit board 210. In addition, first transmission antenna part 221 transmits electromagnetic waves in a direction (see arrow F1) tilted to the + side in the Y direction on the + side in the X direction by shifting the phases of electromagnetic waves radiated from antenna elements 221A, for example. The direction of arrow F1 corresponds to "fifth direction" of the present disclosure.

Second transmission antenna part 222 configures a transmission array composed of a plurality of antenna elements 222A, and is disposed on the − side than first transmission antenna part 221 in the Y direction in circuit board 210. FIG. 14 is a diagram illustrating an example in which four antenna elements 222A are provided. Second transmission antenna part 222 corresponds to "second transmission array" of the present disclosure.

Second transmission antenna part 222 transmits electromagnetic waves parallel to the substrate surface of circuit board 210 toward the + side in the X direction of circuit board 210. To be more specific, second transmission antenna part 222 transmits electromagnetic waves in the direction (see arrow F2) along the X direction on the + side in the X direction. The direction of arrow F2 corresponds to "sixth direction" of the present disclosure.

Reception antenna part 223 includes a plurality of antenna elements 223A, and is disposed in an end region on the − side in the Y direction in circuit board 210. FIG. 14 is a diagram illustrating an example in which four antenna elements 223A are provided.

Reception antenna part 223 receives, from the + side in the X direction of circuit board 210, returning reflected waves that are transmission waves of first transmission antenna part 221 and second transmission antenna part 222 and are reflected by a target (see arrow Fr).

With such an arrangement, in antenna part 220, first transmission antenna part 221 has a directivity of a direction tilted with respect to the X direction (arrow F1), and second transmission antenna part 222 a directivity of the X direction.

Typically, an end-fire array antenna having a directivity to the + side in the X direction of circuit board 210 is applied as antenna part 220. Note that an end-fire array antenna includes a plurality of strip conductors whose longitudinal sides are parallel to each other, and transmits and receives electromagnetic waves along a direction in which the plurality of strip conductors is disposed.

Electromagnetic waves transmitted by antenna elements 221A and 222A for transmission are converted by lens part 230 to plane waves, and output toward the + side in the X direction (here, approximately horizontal direction) outside radar apparatus 200. In addition, returning reflected waves that are electromagnetic waves transmitted by antenna elements 221A and 222A for transmission and reflected by a target outside the apparatus are collected by lens part 230, and output to antenna element 223A for reception. Note that each antenna element is connected to signal processing IC through a wiring line formed on circuit board 210.

In addition, lens part 230 is disposed on the + side in the X direction of antenna part 220. Lens part 230 narrows the beams of electromagnetic waves transmitted by antenna elements 221A and 222A for transmission, and outputs the beams to the region on the + side in the X direction outside the apparatus. Then, lens part 230 collects reflected waves that are transmitted electromagnetic waves returning from the target, and outputs the waves to antenna element 223A for reception. Note that, more preferably, lens part 230 has a configuration of narrowing the beams of electromagnetic waves transmitted by antenna elements 221A and 222A for transmission such that the electromagnetic waves are converted to plane waves.

Lens part 230 also functions as a radome for protecting antenna part 220 while improving the gain when antenna part 220 transmits and receives electromagnetic waves. In this manner, lens part 230 can improve the above-mentioned gain in a wide angle range.

As lens part 230, typically, a single-sided convex lens with a convex surface on the + side in the X direction may be applied. It should be noted that, as lens part 230, a double-sided convex lens, a ball lens, a Fresnel lens, or a combination of them, or, a combination of them and a concave lens and the like may be applied. In addition, lens part 230 may also have a convex shape on the − side in the X direction.

The material of lens part 230 is not limited as long as the function of the lens is achieved, and examples of the material of lens part 230 include acrylic resins, tetrafluoride ethylene resins, polystyrene resins, polycarbonate resins, poly butylene terephthalate resins, polyphenylene resins, polypropylene resins, syndiotactic polystyrene resins, and ABS resins.

Lens part 230 is disposed along the Y direction, and includes first lens 231 and second lens 232 that are integrated with each other.

First lens 231 is disposed at a position corresponding to second transmission antenna part 222 and reception antenna part 223. That is, first lens 231 is disposed at a position where the transmission wave of second transmission antenna part 222 impinges.

Second lens 232 is disposed at a position corresponding to first transmission antenna part 221. That is, second lens 232 is disposed at a position where the transmission wave of first transmission antenna part 221 impinges.

Figure 15A:
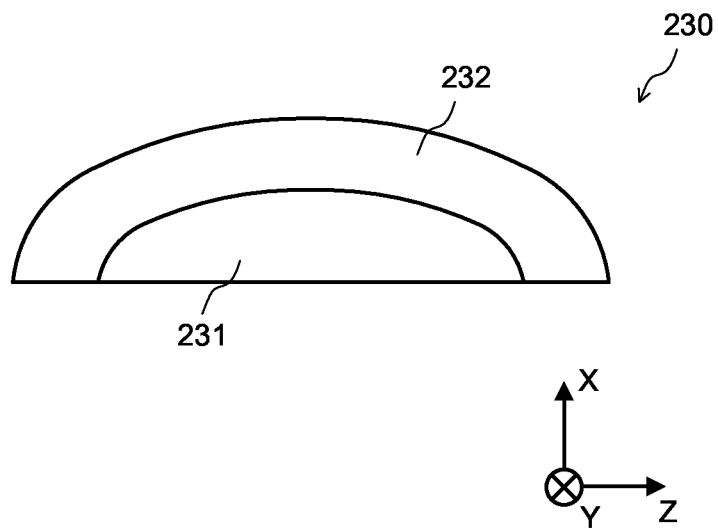
FIG. 15A is a diagram illustrating a lens part as viewed from a Y direction.
Figure 15B:
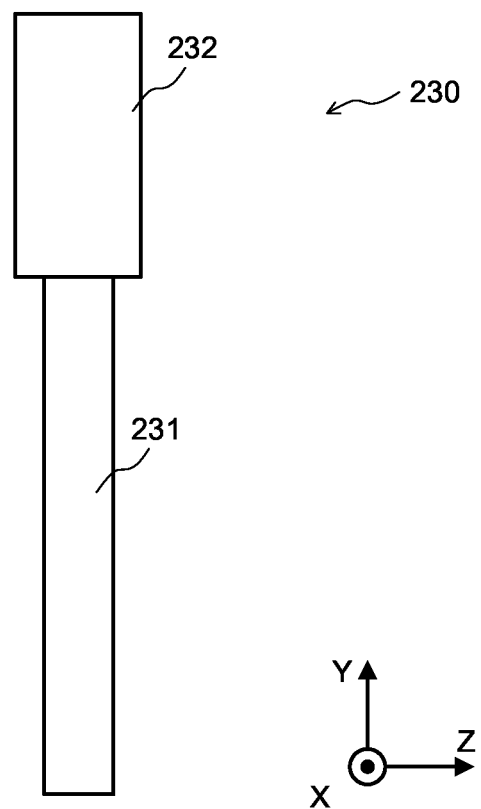
FIG. 15B is a diagram illustrating the lens part as viewed from an X direction.

Second lens 232 has a shape different from that of first lens 231 so as to have a larger opening surface in the direction in which the beams of transmission waves are narrowed than first lens 231. To be more specific, as illustrated in FIGS. 15A and 15B, second lens 232 has a large width in the Z direction and the X direction so as to have a larger convex shape than first lens 231. In addition, the length of second lens 232 in the Y direction (the longitudinal direction of lens part 230) is smaller than the length of first lens 231 in the Y direction. The direction in which the beams of transmission waves are narrowed is the Z direction orthogonal to the direction (Y direction) in which a plurality of antenna elements 221A and 222A are aligned, and the direction (X direction) in which first and second transmission antenna parts 221 and 222 and lens part 230 are opposite to each other, for example.

At first transmission antenna part 221 corresponding to second lens 232, radar apparatus 200 having the above-mentioned configuration outputs transmission waves in a wider and farther range than at first lens 231. In this manner, the detection range of radar apparatus 200 can be broadened.

In addition, if the entire lens part 230 has the same shape as second lens 232 to broaden the detection range in the radar apparatus, the influence of multiple reflection due to reflection of electromagnetic waves through cover member B is increased.

In view of this, in Embodiment 2, second lens 232 is a part of lens part 230, and thus in comparison with the configuration in which the entire lens part 230 is second lens 232, the rate of the multiple reflection is reduced, and the influence of the multiple reflection can be reduced.

That is, in Embodiment 2, the influence of the multiple reflection can be reduced while broadening the detection range.

An operational effect of radar apparatus 200 according to Embodiment 2 having the above-mentioned configuration is described below.

Figure 16A:
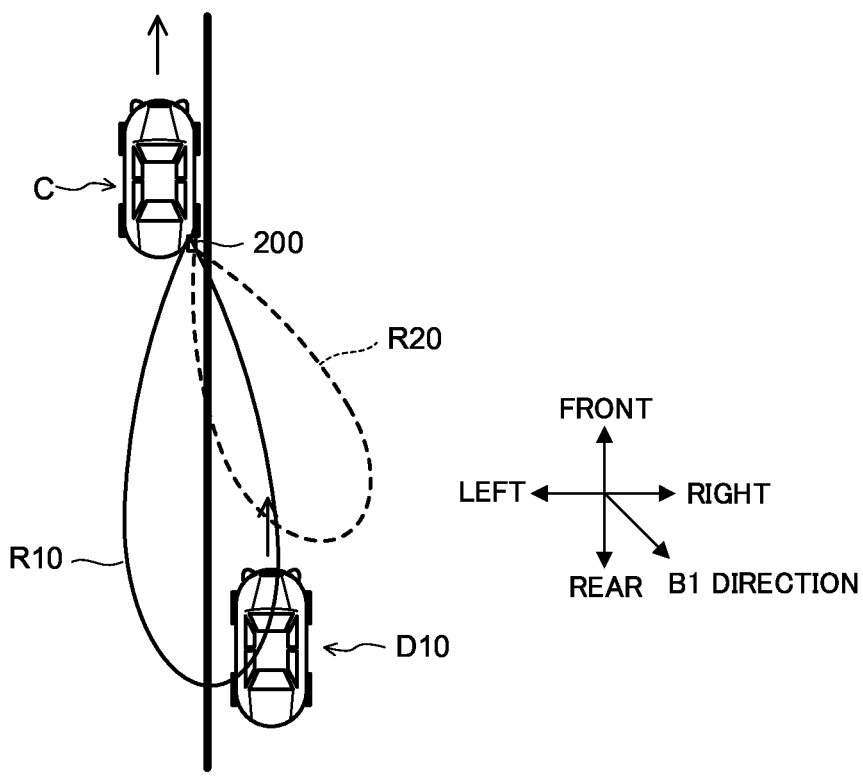
FIG. 16A is a diagram for describing an exemplary operational effect of the radar apparatus.
Figure 16B:
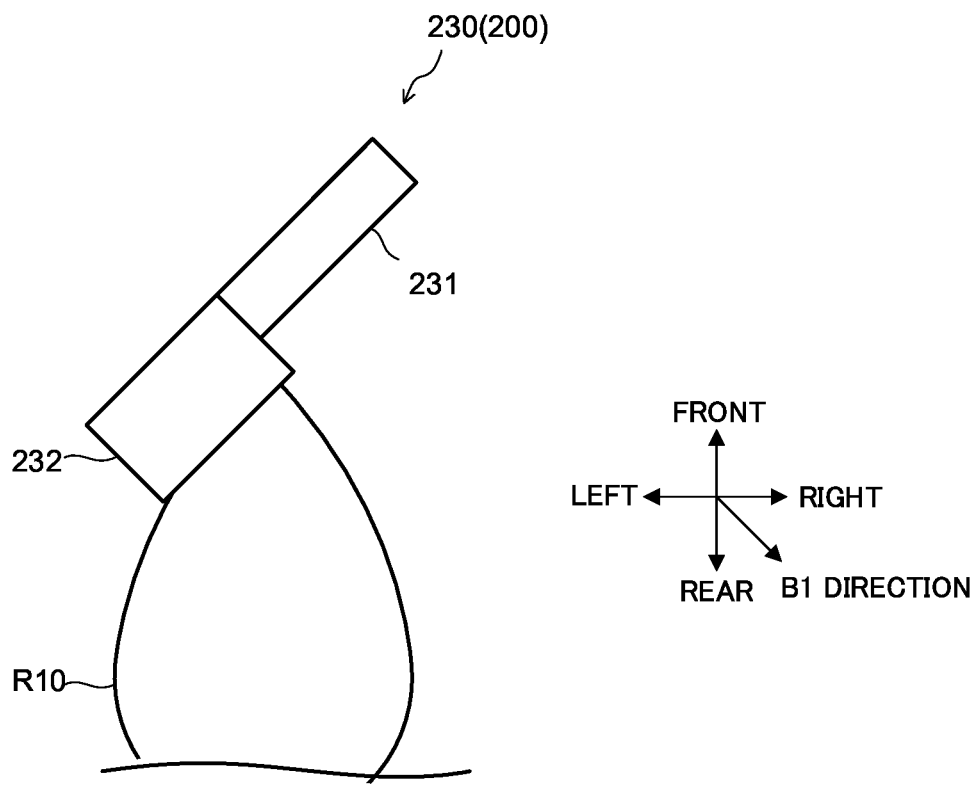
FIG. 16B is a diagram for describing an exemplary operational effect of the radar apparatus.

For example, assume that as illustrated in FIG. 16A, vehicle C equipped with radar apparatus 200 is changing the lane to the adjacent right side lane on the right side of the currently traveling lane. In this case, radar apparatus 200 mounted in a right rear part of vehicle C is used as an apparatus for detecting approaching vehicles behind during lane change. In this case, as illustrated in FIGS. 16A and 16B, radar apparatus 200 is disposed such that the right oblique backward direction of vehicle C (B1 direction) is the X direction. In lens part 230, second lens 232 is disposed on the rear direction side than first lens 231. In radar apparatus 200, detection range R10 of second lens 232 falls within a range of the right rear side of vehicle C, for example. When other vehicle D10 travelling on the right side lane enters detection range R10, the vehicle D10 is detected by radar apparatus 200. Note that the detection range of first lens 231 is directed to the B1 direction (e.g., a range directed to the same direction as detection range R20 illustrated in FIG. 16A).

With such an arrangement of lens part 230, in Embodiment 2, second lens 232 broadens the detection range on the rear side of vehicle C, for example. In this manner, in comparison with detection range R20 (see the broken line) of a configuration in which the shape is the same as first lens 231, detection range R10 of radar apparatus 200 on the right rear side can be broadened to the rear side (see the solid line). As a result, other vehicle D10 travelling on the right side lane can be easily detected.

Figure 17A:
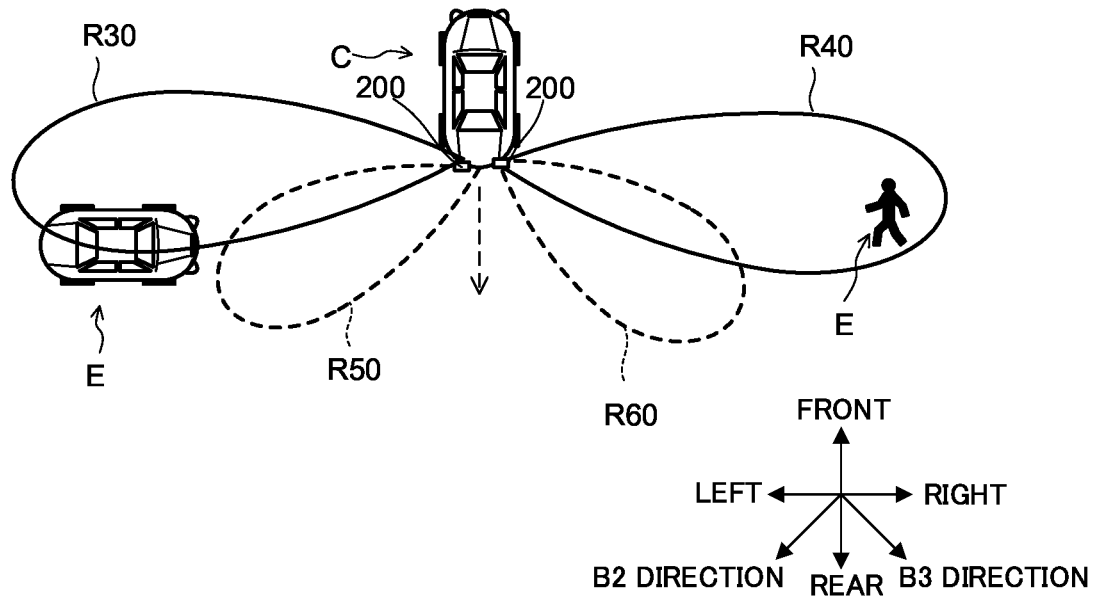
FIG. 17A is a diagram for describing an exemplary operational effect of the radar apparatus.
Figure 17B:
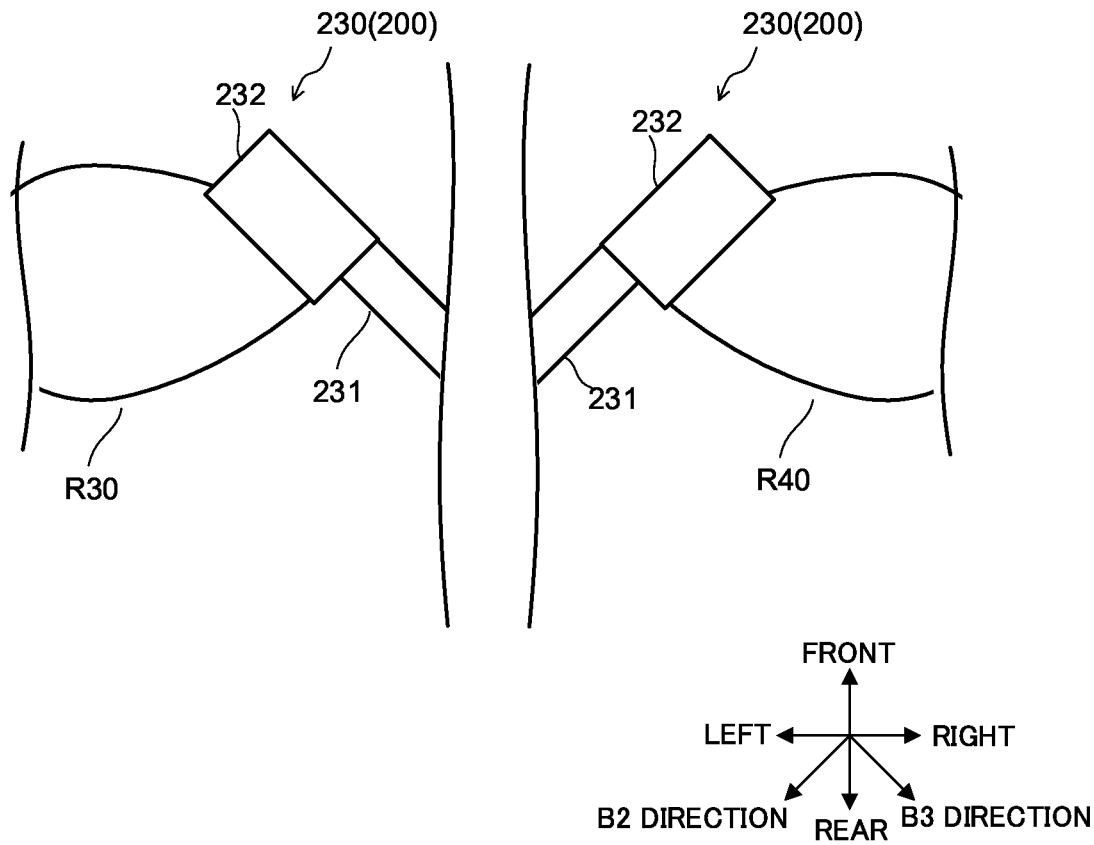
FIG. 17B is a diagram for describing an exemplary operational effect of the radar apparatus.

In addition, assume that as illustrated in FIG. 17A, vehicle C equipped with radar apparatus 200 is moving backward from the parking space to get out of a parking park or the like, for example. In this case, radar apparatuses 200 mounted at both rear ends of vehicle C are used as apparatuses for rearward detection during the rearward movement out of the shed. In this case, as illustrated in FIGS. 17A and 17B, radar apparatus 200 disposed such that the left oblique rear direction of vehicle C (B2 direction) is the X direction, and radar apparatus 200 disposed such that the right oblique backward direction of vehicle C (B3 direction) is the X direction are provided. In lens part 230, second lens 232 is disposed on the front direction side than first lens 231. Detection ranges R30 and R40 of radar apparatus 200 are the ranges on the left and right sides on the lateral rear side of vehicle C, for example. When moving object E on the left and right sides on the lateral rear side of vehicle C (such as a pedestrian and another vehicle) or the like enters detection ranges R30 and R40, moving object E is detected by radar apparatus 200. Note that each detection range of first lens 231 is a range directed to the B2 direction, and a range directed to the B3 direction (e.g., a range directed to the same direction as detection range R50 and a range directed to the same direction as detection range R60 illustrated in FIG. 17A).

With such an arrangement of second lens 232, in Embodiment 2, second lens 232 broadens the detection range on the lateral side of vehicle C, for example. In this manner, in comparison with detection ranges R50 and R60 (see the broken line) of a configuration in which the entire lens part has the same shape as first lens 231, detection ranges R30 and R40 of radar apparatus 200 can be broadened to the left and right sides on the lateral rear side (see the solid line). As a result, moving object E on the left and right sides on the lateral rear side of vehicle C can be easily detected.

Figure 18A:
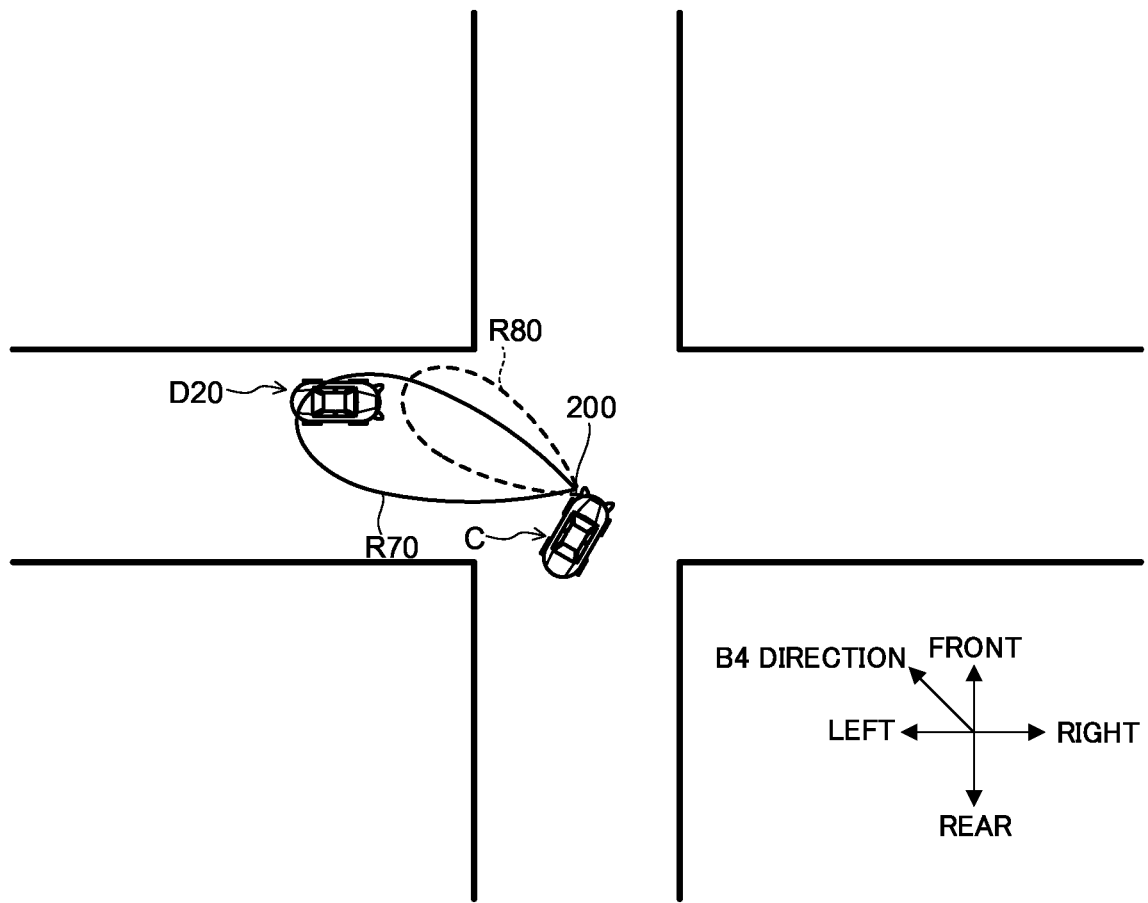
FIG. 18A is a diagram for describing an exemplary operational effect of the radar apparatus.
Figure 18B:
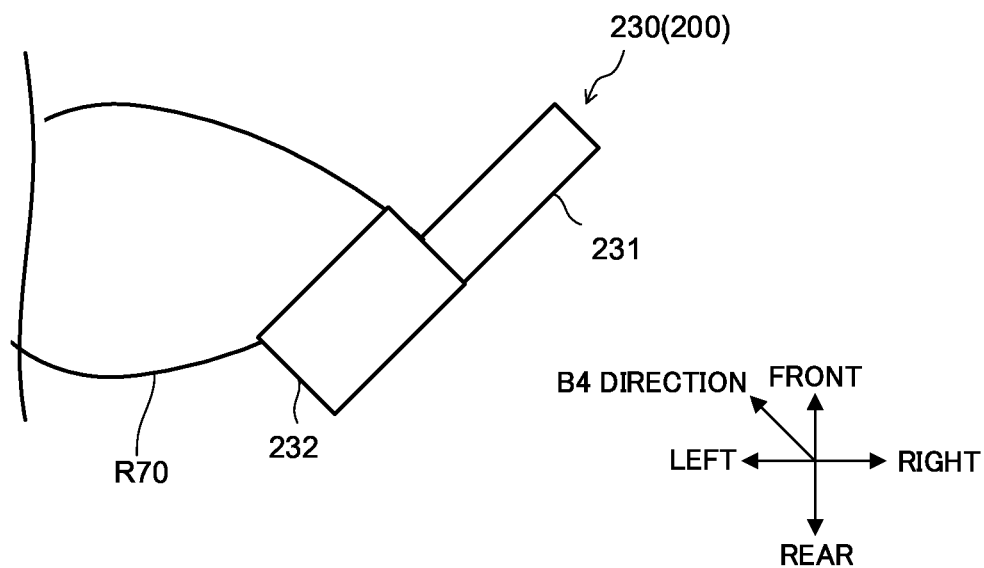
FIG. 18B is a diagram for describing an exemplary operational effect of the radar apparatus.

In addition, assume that as illustrated in FIG. 18A, vehicle C equipped with radar apparatus 200 is turning right at an intersection, for example. In this case, as illustrated in FIGS. 18A and 18B, radar apparatus 200 is disposed such that the leftward direction of vehicle C (B4 direction) is the X direction. In lens part 230, second lens 232 is disposed on the rear direction side than first lens 231. In this case, when vehicle C is waiting for the right turn, radar apparatus 200 mounted at the front left end of vehicle C detects a moving object in a region on the left front side of vehicle C (e.g., other vehicle D20 waiting for a signal in the lane where the right turn is to be made). Detection range R70 of radar apparatus 200 is a range on the left side of the front lateral side of vehicle C, for example. Note that detection range of first lens 231 is a range directed to the B4 direction (e.g., a range directed to the same direction as detection range R80 illustrated in FIG. 18A).

With such an arrangement of second lens 232, in Embodiment 2, second lens 232 broadens the left side detection range of vehicle C. In this manner, detection range R70 of radar apparatus 200 on the left rear side of vehicle C can be broadened in comparison with detection range R80 (see the broken line) of a configuration in which the entire lens part has the same shape as first lens 231 (see the solid line). As a result, when vehicle C is waiting for the right turn, a moving object and the like on the left oblique rear side of vehicle C can be easily detected.

As described above, in Embodiment 2, a part of lens part 230 is second lens 232, and thus the influence of the multiple reflection can be reduced while broadening the detection range.

In addition, if the entire lens part has the same shape as the second lens, the size of the entire radar apparatus increases. Consequently, the space for disposing the radar apparatus in vehicle C may be affected, and the external appearance of vehicle C may be affected by the radar apparatus disposed thereto.

In contrast, in Embodiment 2, it is only necessary that a part of lens part 230 is second lens 232. Thus, in comparison with a configuration in which the entire lens part has the same shape as the second lens, it is possible to reduce the influence on the space for disposing the radar apparatus in vehicle C, and the influence of the radar apparatus disposed thereto on the external appearance of vehicle C. In addition, since the length of second lens 232 in the Y direction is smaller than the length of first lens 231 in the Y direction, the above-mentioned influences can be further reduced.

In addition, with the configuration in which transmission waves received by lens part 230 are narrowed and output to the outside of the apparatus, it is not necessary to increase the size of second lens 232 more than necessary. As a result, the size of the portion serving as second lens 232 can be reduced as a whole.

In addition, in Embodiment 2, first transmission antenna part 221 transmits electromagnetic waves in the direction of arrow F1. In other words, first transmission antenna part 221 transmits electromagnetic waves in a direction (fifth direction) tilted to second lens 232 side with respect to the boundary between first lens 231 and second lens 232.

In this manner, transmission waves of first transmission antenna part 221 can be reliably prevented from travelling to the first lens 231 side. As a result, second lens 232 can reliably receive transmission waves of first transmission antenna part 221.

Note that while the fifth direction is the direction of arrow F1 in Embodiment 2, the present disclosure is not limited to this, and a direction different from arrow F1 such as the direction along the X direction may be used as long as transmission waves of first transmission antenna part 221 are received by second lens 232.

In addition, while the direction of transmission waves of second transmission antenna part 222 is the direction along the X direction (arrow F2) in Embodiment 2, the present disclosure is not limited to this, and a direction different from arrow F2 may be used as long as the transmission waves are received by first lens 231. For example, second transmission antenna part 222 may transmit electromagnetic waves in a direction tilted to the first lens 231 side with respect to the boundary between first lens 231 and second lens 232.

Figure 19:
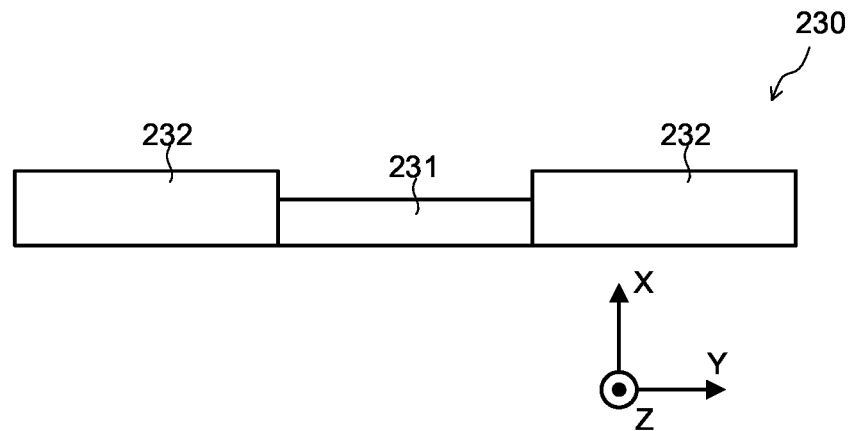
FIG. 19 is a diagram illustrating a lens part according to a modification.

In addition, while second lens 232 is provided at an end portion of lens part 230 on the + side in the Y direction of in Embodiment 2, the present disclosure is not limited to this. For example, as illustrated in FIG. 19, second lens 232 may be provided at end portions on both sides in the Y direction of lens part 230.

Figure 20:
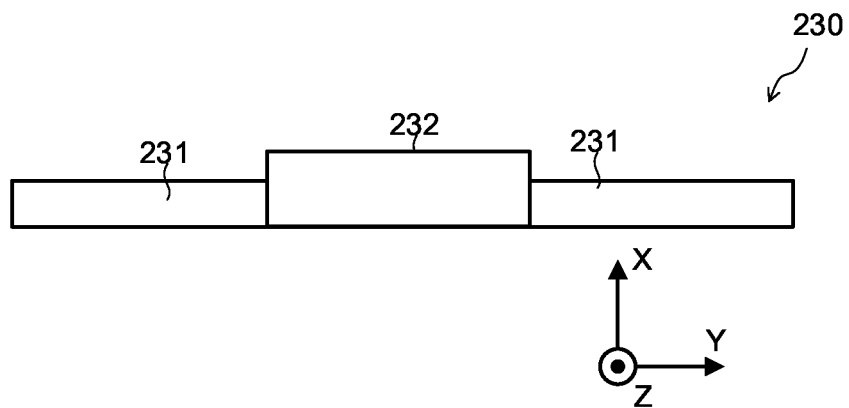
FIG. 20 is a diagram illustrating a lens part according to a modification.

In addition, as illustrated in FIG. 20, it is also possible to adopt a configuration in which second lens 232 is sandwiched by first lenses 231 from both sides in the Y direction.

Figure 21:
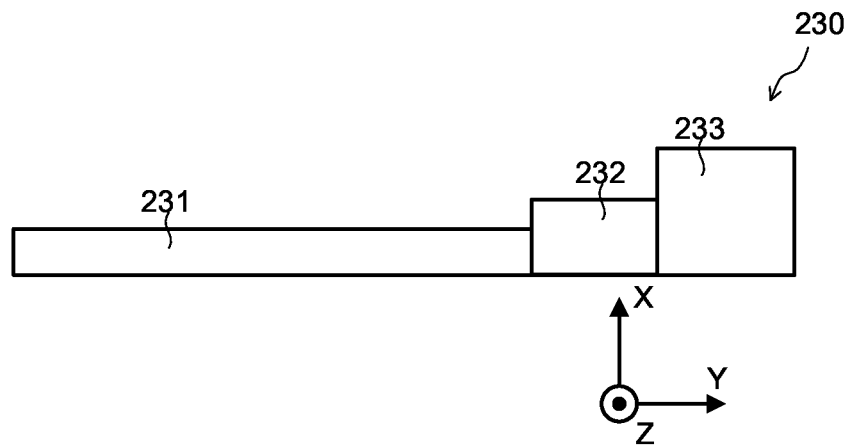
FIG. 21 is a diagram illustrating a lens part according to a modification.

In addition, as illustrated in FIG. 21, lens part 230 may include third lens 233 having a shape different from those of first lens 231 and second lens 232. In this configuration, third lens 233 is provided on the + side in the Y direction than second lens 232.

Third lens 233 is configured to have a larger opening surface than those of first lens 231 and second lens 232. Third lens 233 is wider in the Z direction and is wider in the X direction than second lens 232. Third lens 233 receives transmission waves of a third transmission antenna part different from first transmission antenna part 221 and second transmission antenna part 222. The third transmission antenna part is disposed on the + side in the Y direction than first transmission antenna part 221 in FIG. 14, for example.

In addition, while second transmission antenna part 222 is provided in Embodiment 2, the present disclosure is not limited to this. Second transmission antenna part 222 may not be provided, and a transmission antenna element may be further provided.

In addition, while first lens 231 and second lens 232 are integrated with each other in Embodiment 2, the present disclosure is not limited to this, and the first lens and the second lens may be composed of separate members.

In the above-described embodiments, " . . . part" used for denoting each component may be replaced by " . . . circuit (circuitry)", " . . . assembly", " . . . device," " . . . unit," or " . . . module".

Each of the above embodiments is only an example of an embodiment in implementing the present disclosure, and the technical scope of the present disclosure should not be construed as limited by them. That is, the present disclosure may be implemented in various forms without departing from its gist or its main features.

The radar apparatus of Embodiment 2 of the present disclosure includes a transmission antenna part including at least one transmission array composed of a plurality of antenna elements and configured to transmit transmission waves in the fifth direction, and a lens part including a first lens and a second lens disposed at a position for receiving transmission waves of the at least one transmission array. The second lens has a shape different from that of the first lens so as to have a larger opening surface, than the first lens, in the direction in which transmission wave beams are narrowed.

In the radar apparatus of Embodiment 2 of the present disclosure, a reception antenna part configured to receive reflected waves of transmission waves of the transmission antenna part is provided, and the first lens collects at least the reflected waves to the reception antenna part and outputs the waves to the reception antenna part.

In the radar apparatus of Embodiment 2 of the present disclosure, the at least one transmission array transmits the transmission waves in the fifth direction that is the second lens side with respect to the boundary between the first lens and the second lens.

In the radar apparatus of Embodiment 2 of the present disclosure, the transmission antenna part includes a first transmission array configured to transmit transmission waves in the fifth direction and a second transmission array configured to transmit transmission waves in a sixth direction different from the fifth direction. The transmission waves of the second transmission array impinge on the first lens, and the transmission waves of the first transmission array impinge on the second lens.

In the radar apparatus of Embodiment 2 of the present disclosure, the length of the second lens in a direction along the longitudinal direction of the lens part is smaller than the length of the first lens in a direction along the longitudinal direction.

In the radar apparatus of Embodiment 2 of the present disclosure, the direction in which beams of transmission wave are narrowed is a direction orthogonal to the direction in which the plurality of antenna elements is aligned and to the direction in which the transmission array and the lens part are opposite each other.

While various embodiments have been described herein above, it is to be appreciated that various changes in form and detail may be made without departing from the spirit and scope of the invention(s) presently or hereafter claimed.

This application is entitled to and claims the benefit of Japanese Patent Application No. 2020-012307, filed on Jan. 29, 2020 and Japanese Patent Application No. 2020-012310, filed on Jan. 29, 2020, the disclosure of which including the specification, drawings and abstract is incorporated herein by reference in its entirety.

INDUSTRIAL APPLICABILITY

The radar apparatus of the present disclosure is useful as a radar apparatus that can be easily manufactured, and can increase lateral directivity.

What is claimed is:

1. A radar apparatus, comprising:
an antenna composed of an end-fire array antenna including a plurality of antenna elements; and
a circuit board in which the plurality of antenna elements are disposed in parallel along a first direction,
wherein at least one of the plurality of antenna elements is parallel to a substrate surface of the circuit board, and
wherein a directivity of a transmission beam transmitted by at least one of the plurality of antenna elements is set to a third direction tilted with respect to the first direction and a second direction orthogonal to the first direction.

2. The radar apparatus according to claim 1, wherein at least one of the plurality of antenna elements includes
a first portion disposed along the third direction, and
a second portion disposed from an end portion of the first portion in the third direction, the second portion being disposed along a fourth direction that is orthogonal to the third direction and is tilted with respect to the first direction.

3. The radar apparatus according to claim 2, further comprising:
a first reflection part disposed on a side opposite to the third direction with respect to the second portion of the at least one of the plurality of antenna elements and configured to reflect electromagnetic waves toward the third direction,
wherein a reflection surface of the first reflection part is parallel to the second portion.

4. The radar apparatus according to claim 2, wherein end portions of the second portions of the plurality of antenna elements are disposed on a straight line parallel to the first direction at a predetermined position in the second direction.

5. The radar apparatus according to claim 1, further comprising:
a second reflection part disposed inside the circuit board and configured to reflect electromagnetic waves radiated inside the circuit board,
wherein the second reflection part is disposed between an outer edge of the circuit board and the at least one of the plurality of antenna elements in the second direction.

6. The radar apparatus according to claim 5, wherein an end portion of the second reflection part in the second direction includes a cutout portion recessed toward the at least one of the plurality of antenna elements.

7. The radar apparatus according to claim 1, wherein an end region of the circuit board extends in parallel along the first direction and the directivity of the transmission beam of the at least one of the plurality of antenna elements is tilted with respect to the end region of the circuit board.

8. The radar apparatus according to claim 1, wherein the plurality of antenna elements comprise:
first transmission antenna elements; and
second transmission antenna elements, wherein
the directivity of the transmission beam transmitted by the first transmission antenna elements is set to the third direction, and
the directivity of the transmission beam transmitted by the second transmission antenna elements is set to the second direction.

* * * * *